US012580915B2

(12) United States Patent
Yin et al.

(10) Patent No.: US 12,580,915 B2
(45) Date of Patent: Mar. 17, 2026

(54) SERVICE ACCESS METHOD AND APPARATUS

(71) Applicant: Shenzhen Yinwang Intelligent Technologies, Co., Ltd., Shenzhen (CN)

(72) Inventors: Xinxing Yin, Shanghai (CN); Jiangqi Li, Shenzhen (CN); Guangyu Zhou, Shanghai (CN); Aifen Sui, Munich (DE)

(73) Assignee: Shenzhen Yinwang Intelligent Technologies, Co., Ltd., Shenzhen (CN)

( * ) Notice: Subject to any disclaimer, the term of this patent is extended or adjusted under 35 U.S.C. 154(b) by 31 days.

(21) Appl. No.: 18/489,647

(22) Filed: Oct. 18, 2023

(65) Prior Publication Data

US 2024/0048563 A1 Feb. 8, 2024

Related U.S. Application Data

(63) Continuation of application No. PCT/CN2021/088192, filed on Apr. 19, 2021.

(51) Int. Cl.
*H04L 9/40* (2022.01)

(52) U.S. Cl.
CPC .......... *H04L 63/10* (2013.01); *H04L 63/0807* (2013.01); *H04L 63/0876* (2013.01)

(58) Field of Classification Search
None
See application file for complete search history.

(56) References Cited

U.S. PATENT DOCUMENTS

2015/0150106 A1* 5/2015 Lund ..................... H04L 63/083
726/7
2018/0212955 A1 7/2018 Qin et al.
(Continued)

FOREIGN PATENT DOCUMENTS

CN 111209578 A 5/2020
CN 112671798 A 4/2021

OTHER PUBLICATIONS

"Explanation of Identity and Access Management," AutoSar AP R23-11, total 13 pages (Nov. 23, 2023).
(Continued)

*Primary Examiner* — Christopher C Harris
(74) *Attorney, Agent, or Firm* — Leydig, Voit & Mayer, Ltd.

(57) ABSTRACT

A service access method and an apparatus are disclosed. The method includes: obtaining, from system data, a first identifier corresponding to a service requesting unit; obtaining, from a first access request, a second identifier corresponding to a service, where the first access request indicates that the service requesting unit requests the service from a service providing unit; determining an authentication result based on the first identifier and the second identifier, where the authentication result indicates whether the service requesting unit has a permission to access the service; when the authentication result indicates that the service requesting unit has the permission to access the service, generating a second access request; and sending the second access request to the service providing unit.

20 Claims, 11 Drawing Sheets

(56) References Cited

U.S. PATENT DOCUMENTS

| 2018/0309759 A1* | 10/2018 | Leibmann | H04L 63/105 |
| 2020/0259654 A1* | 8/2020 | Barnes | H04L 67/12 |
| 2021/0092115 A1* | 3/2021 | Bhattacharyya | H04L 63/0442 |
| 2021/0409400 A1* | 12/2021 | Palanisamy | H04L 67/12 |
| 2022/0150066 A1* | 5/2022 | Sugarev | H04L 9/3247 |

OTHER PUBLICATIONS

"Requirements on Identity and Access Management," AutoSar AP R23-11, total 20 pages (Nov. 23, 2023).

* cited by examiner

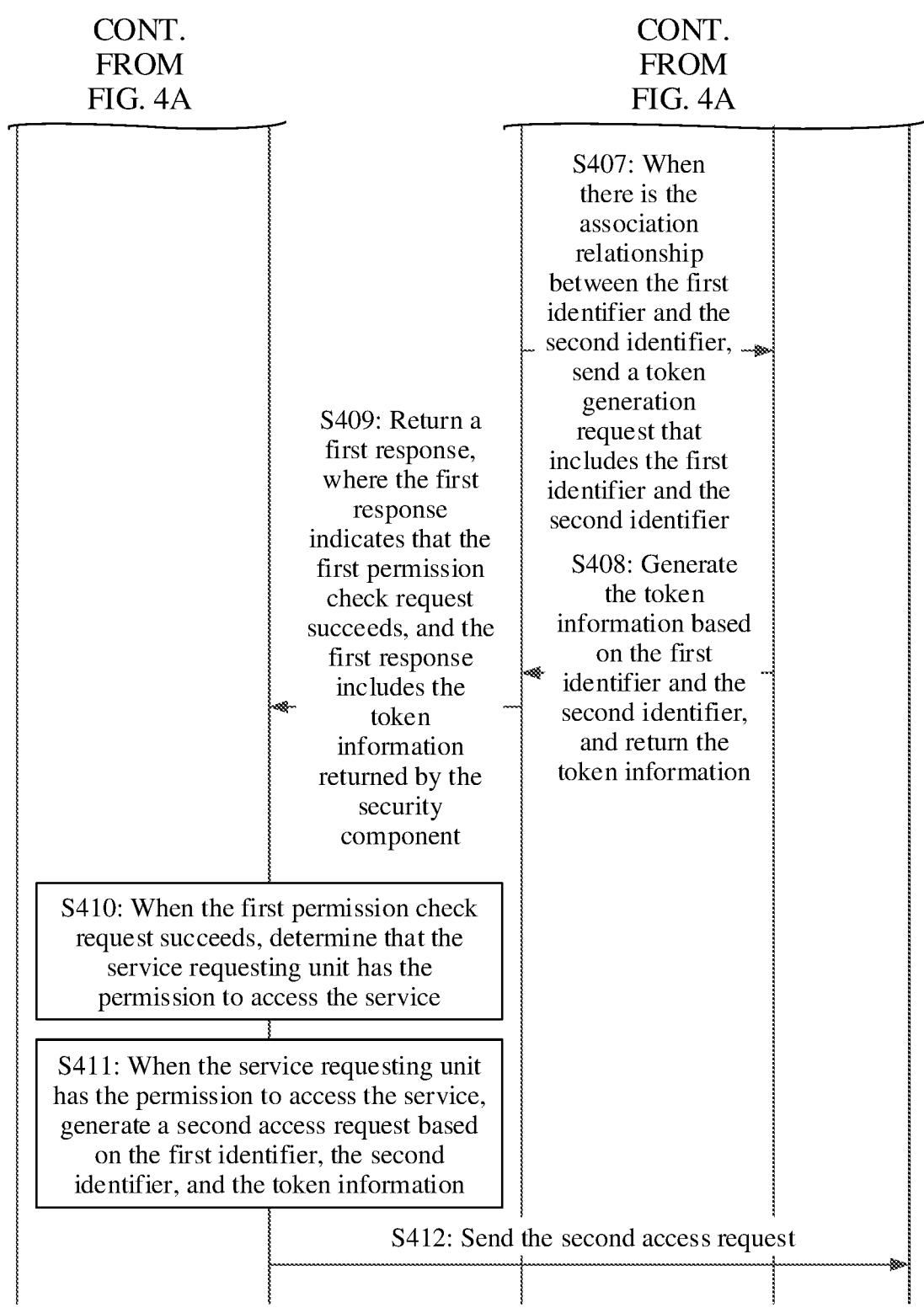

CONT.
FROM
FIG. 4A

CONT.
FROM
FIG. 4A

S407: When there is the association relationship between the first identifier and the second identifier, send a token generation request that includes the first identifier and the second identifier S409: Return a first response, where the first response indicates that the first permission check request succeeds, and the first response includes the token information returned by the security component S408: Generate the token information based on the first identifier and the second identifier, and return the token information S410: When the first permission check request succeeds, determine that the service requesting unit has the permission to access the service S411: When the service requesting unit has the permission to access the service, generate a second access request based on the first identifier, the second identifier, and the token information S412: Send the second access request

FIG. 4B

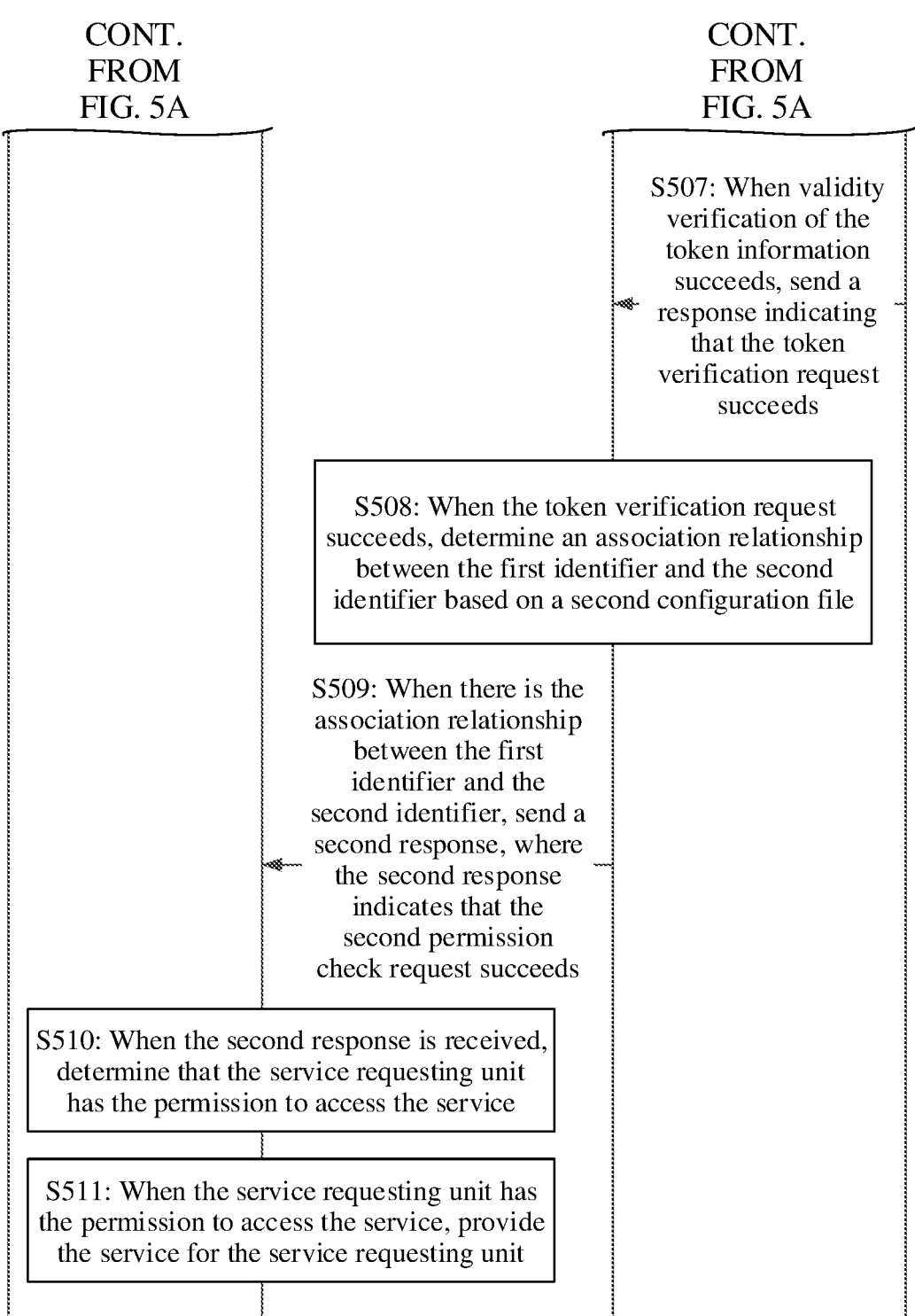

CONT.
FROM
FIG. 5A

CONT.
FROM
FIG. 5A

S507: When validity verification of the token information succeeds, send a response indicating that the token verification request succeeds S508: When the token verification request succeeds, determine an association relationship between the first identifier and the second identifier based on a second configuration file S509: When there is the association relationship between the first identifier and the second identifier, send a second response, where the second response indicates that the second permission check request succeeds S510: When the second response is received, determine that the service requesting unit has the permission to access the service S511: When the service requesting unit has the permission to access the service, provide the service for the service requesting unit

FIG. 5B

SERVICE ACCESS METHOD AND APPARATUS

CROSS-REFERENCE TO RELATED APPLICATIONS

This application is a continuation of International Application No. PCT/CN2021/088192, filed on Apr. 19, 2021, the disclosure of which is hereby incorporated by reference in its entirety.

TECHNICAL FIELD

This application relates to the internet of vehicles field, and in particular, to a service access method and apparatus.

BACKGROUND

With a development trend towards networked, intelligent, shared, and electric vehicles, a connection mode, power input, and business model of the vehicles have changed. In the future, vehicles are not only transportation tools, but also valuable space integrating driving, entertainment, office, and consumption.

An intelligent digital vehicle platform combines a ring network architecture with a software platform, supports cross-vehicle model, cross-platform, and cross-vehicle enterprise rapid application development and reuse, hardware scalability and replacement, sensor plug and play, and the like, and makes a vehicle become a platform for continuous value creation. The ring network architecture uses an in-vehicle ring Ethernet with high reliability, low latency, and high bandwidth, and provides two types of open application programming interfaces, and hardware resources abstraction interfaces for shielding differences of accessed physical devices, to provide vehicle-level resource management. The software platform is located above the ring network architecture and provides an intelligent vehicle control operating system, intelligent driving operating system, intelligent cockpit operating system, and the like. In addition, the software platform abstracts an atomic service layer and an enhanced service layer for invocation by an upper-layer application, a vehicle cloud service, a third-party cloud service, and the like.

In a scenario in which the ring network architecture is combined with the software platform, service access may occur between different electronic control units (ECU) and controllers (such as a vehicle controller and a body controller), operating systems (OS) run by the ECUs may be different, and platforms on which the controllers are deployed may be different. Based on this, it is of great significance to implement security control of cross-vehicle model, cross-platform, and cross-system service access.

SUMMARY

In view of this, a service access method and apparatus are provided, so as to improve service access security.

According to a first aspect, an embodiment of this application provides a service access method, where the method includes: obtaining, from system data, a first identifier corresponding to a service requesting unit; obtaining, from a first access request, a second identifier corresponding to a service, where the first access request indicates that the service requesting unit requests the service from a service providing unit; determining an authentication result based on the first identifier and the second identifier, where the authentication result indicates whether the service requesting unit has permission to access the service; when the authentication result indicates that the service requesting unit has the permission to access the service, generating a second access request; and sending the second access request to the service providing unit.

In this embodiment of this application, a real identity of the service requesting unit can be identified by obtaining the first identifier corresponding to the service requesting unit from the system data, so that a service requesting unit without the service access permission cannot forge an identity of another service requesting unit with the service access permission to perform an access request. Therefore, reliability of the identity of the service requesting unit is improved, and authenticity of the access request is improved. Before the service is requested from the service providing unit, the access permission of the service requesting unit is verified. Therefore, invalid access requests are reduced. In this way, effectiveness of the access request is improved, communication resources are saved, and a workload of the service providing unit is reduced.

According to the first aspect, in any one of the possible implementations of the service access method, the determining an authentication result based on the first identifier and the second identifier includes: when no token information that matches the first identifier and the second identifier is found, sending a first permission check request to an authentication management unit, where the first permission check request requests the authentication management unit to check whether the service requesting unit has the permission to access the service, and the first permission check request includes the first identifier and the second identifier; and when the first permission check request succeeds, determining that the service requesting unit has the permission to access the service.

In this way, invalid requests can be filtered out, and effectiveness and validity of access requests can be improved.

According to any one of the possible implementations of the first aspect, in a possible implementation of the service access method, the generating a second access request includes: generating the second access request based on the first identifier, the second identifier, and token information returned by the authentication management unit.

In this way, the service providing unit can determine a request of the service requesting unit, to implement service invoking.

According to any one of the possible implementations of the first aspect, in a possible implementation of the service access method, the method further includes: establishing an association relationship between the token information and both the first identifier and the second identifier.

In this way, when a same access request is subsequently received, token information does not need to be generated again, to save communication resources and computing resources.

According to any one of the possible implementations of the first aspect, in a possible implementation of the service method, the determining an authentication result based on the first identifier and the second identifier includes: when token information that matches the first identifier and the second identifier is found, determining that the service requesting unit has the permission to access the service.

In this way, communication resources and computing resources can be saved by using the existing token information.

According to any one of the possible implementations of the first aspect, in a possible implementation of the service access method, the generating a second access request includes: generating the second access request based on the first identifier, the second identifier, and the token information that matches the first identifier and the second identifier.

In this way, the access request is generated by using the existing token information, to save time and resources.

According to any one of the possible implementations of the first aspect, in a possible implementation of the service method, when the service requesting unit is in a first state, the token information associated with the first identifier is in an unavailable state; or when the service requesting unit is in a second state, the token information associated with the first identifier is in an available state.

According to any one of the possible implementations of the first aspect, in a possible implementation of the service method, the method further includes: determining a state of a service authentication switch corresponding to the first identifier in a first service configuration file, where the first service configuration file indicates an association relationship between the first identifier and a state of a service authentication switch corresponding to the service requesting unit.

In this way, by setting the service authentication switch, whether to perform service authentication can be flexibly controlled, thereby improving applicability.

According to any one of the possible implementations of the first aspect, in a possible implementation of the service access method, the determining an authentication result based on the first identifier and the second identifier includes: when the state of the service authentication switch is a third state, determining the authentication result based on the first identifier and the second identifier.

In this way, authentication can be implemented, invalid requests can be reduced, resources can be saved, and service access security can be improved.

According to any one of the possible implementations of the first aspect, in a possible implementation of the service access method, the method further includes: when the state of the service authentication switch is a fourth state, generating a third access request based on the first identifier and the second identifier; and sending the third access request to the service providing unit.

In this way, authentication is not required, and service access time is saved.

According to a second aspect, an embodiment of this application provides a service access method, where the method includes: receiving a first permission check request from a communication unit, where the first permission check request requests to check whether a service requesting unit has permission to access a service, and the first permission check request includes a first identifier corresponding to the service requesting unit and a second identifier corresponding to the service; determining an association relationship between the first identifier and the second identifier based on a second service configuration file, where the second service configuration file indicates an association relationship between the first identifier and the second identifier corresponding to the service to which the service requesting unit has the access permission; when there is the association relationship between the first identifier and the second identifier, obtaining token information based on the first identifier and the second identifier; and returning a first response to the communication unit, where the first response indicates that the first permission check request succeeds, and the first response includes the token information.

In this embodiment of this application, in response to the first permission check request from the communication unit, the association relationship between the first identifier and the second identifier is checked, and when there is the association relationship between the first identifier and the second identifier, it is determined that the service requesting unit has the permission to access the service, so that the communication unit can identify a valid access request and an invalid access request, to reduce a quantity of invalid access requests arrive at the service providing unit, reduce a possibility that the service providing unit is attacked by a large quantity of invalid access requests, and improve security of the service providing unit. In addition, communication resources between the communication unit and the service providing unit are saved, and a workload of the service providing unit is reduced.

According to the second aspect, in a possible implementation of the service access method, the obtaining token information based on the first identifier and the second identifier includes: sending a token generation request to a security component, where the token generation request includes the first identifier and the second identifier, so that the security component performs encryption processing on the first identifier and the second identifier to obtain the token information; and receiving the token information returned by the security component.

In this way, the token information may be generated, thereby facilitating subsequent authentication on the communication unit and the service providing unit.

According to any one of the possible implementations of the second aspect, in a possible implementation of the service access method, the method further includes: receiving a second permission check request from a service providing unit, where the second permission check request requests to check whether the service requesting unit has the permission to access the service, and the second permission check request includes the first identifier, the second identifier, and the token information; verifying validity of the token information based on the first identifier and the second identifier; when validity verification of the token information succeeds, determining the association relationship between the first identifier and the second identifier based on the second service configuration file; and when there is the association relationship between the first identifier and the second identifier, returning a second response to the service providing unit, where the second response indicates that the second permission check request succeeds.

In this way, the service providing unit can perform permission control on the service requesting unit, to reduce invalid authorization and improve validity of service authorization.

According to any one of the possible implementations of the second aspect, in a possible implementation of the service access method, the verifying validity of the token information based on the first identifier and the second identifier includes: sending a token verification request to a security component, where the token verification request includes the first identifier, the second identifier, and the token information, so that the security component verifies the validity of the token information based on the first identifier, the second identifier, and the decrypted token information.

In this way, when the token information is valid, permission is verified, to further ensure that the first identifier and the second identifier are not tampered with in a transmission process. This improves security.

According to a third aspect, an embodiment of this application provides a service access system, where the service access system includes a service requesting unit, a communication unit, and a service providing unit. The service requesting unit is configured to send a first access request, where the first access request requests a service from the service providing unit. The communication unit is configured to: obtain, from system data, a first identifier corresponding to the service requesting unit; obtain, from the first access request, a second identifier corresponding to the service; determine an authentication result based on the first identifier and the second identifier, where the authentication result indicates whether the service requesting unit has permission to access the service; and when the authentication result indicates that the service requesting unit has the permission to access the service, generate a second access request, and send the second access request to the service providing unit. The service providing unit is configured to provide the service to the service providing unit based on the received second access request.

According to the third aspect, in a possible implementation of the service access system, the service requesting unit, the communication unit, and the service providing unit are located distributed in different apparatuses, or in a same apparatus.

According to any of the possible implementations of the third aspect, in a possible implementation of the service access system, the service access system further includes an authentication management unit. The communication unit is further configured to: when no token information that matches the first identifier and the second identifier is found, send a first permission check request to the authentication management unit, where the first permission check request requests the authentication management unit to check whether the service requesting unit has the permission to access the service, and the first permission check request includes the first identifier and the second identifier; and when the first permission check request succeeds, determine that the service requesting unit has the permission to access the service. The authentication management unit is configured to: receive the first permission check request from the communication unit; determine an association relationship between the first identifier and the second identifier based on a second service configuration file, where the second service configuration file indicates the association relationship between the first identifier and the second identifier corresponding to the service to which the service requesting unit has the access permission; when there is the association relationship between the first identifier and the second identifier, obtain the token information based on the first identifier and the second identifier; and return a first response to the communication unit, where the first response indicates that the first permission check request succeeds, and the first response includes the token information.

According to any of the possible implementations of the third aspect, in a possible implementation of the service access system, the service access system further includes a security component. The authentication management unit is further configured to send a token generation request to the security component, where the token generation request includes the first identifier and the second identifier. The security component is configured to: perform encryption processing on the first identifier and the second identifier to obtain the token information; and return the token information to the authentication management unit.

According to any one of the possible implementations of the third aspect, in a possible implementation of the third aspect, the authentication management unit is further configured to: receive a second permission check request from the service providing unit, where the second permission check request requests to check whether the service requesting unit has the permission to access the service, and the second permission check request includes the first identifier, the second identifier, and the token information; verify validity of the token information based on the first identifier and the second identifier; when validity verification of the token information succeeds, determine the association relationship between the first identifier and the second identifier based on the second service configuration file; and when there is the association relationship between the first identifier and the second identifier, return a second response to the service providing unit, where the second response indicates that the second permission check request succeeds.

According to any one of the possible implementations of the third aspect, in a possible implementation of the third aspect, the authentication management unit is further configured to send a token verification request to the security component, where the token verification request includes the first identifier, the second identifier, and the token information. The security component is further configured to verify the validity of the token information based on the first identifier, the second identifier, and the decrypted token information.

According to a fourth aspect, an embodiment of this application provides a service access apparatus. The service access apparatus may perform one or more of the service access methods in the first aspect or the plurality of possible implementations of the first aspect, or may perform one or more of the service access methods in the second aspect or the plurality of possible implementations of the second aspect.

According to a fifth aspect, this application further provides a service access apparatus, including a service requesting unit, a communication unit, and a service providing unit. The apparatus is configured to implement the method described in the first aspect or any one of the possible implementations of the first aspect, or is configured to implement the method described in the second aspect or any one of the possible implementations of the second aspect.

Optionally, the apparatus further includes an authentication management unit.

According to a sixth aspect, this application provides a chip system. The chip system includes at least one processor, configured to support implementation of a function in any one of the first aspect and the second aspect, for example, receiving or processing data and/or information in the foregoing method.

In a possible design, the chip system further includes a memory, the memory is configured to store program instructions and data, and the memory is located inside or outside the processor. The chip system may include a chip, or may include a chip and another discrete component.

According to a seventh aspect, this application further provides a service access apparatus, where the service access apparatus includes at least one processor and a communication interface, the communication interface is configured to send and/or receive data, and the at least one processor is configured to invoke a computer program stored in at least one memory, so that the service access apparatus implements the method described in any one of the first aspect and the second aspect or any one of the possible implementations of the first aspect and the second aspect.

According to an eighth aspect, this application further provides a computer-readable storage medium, where the computer-readable storage medium stores a computer program, and when the computer program runs on one or more processors, the method described in any one of the first aspect and the second aspect (or any one of the possible implementations of the first aspect and the second aspect) is implemented.

According to a ninth aspect, an embodiment of this application provides a computer program product, including computer-readable code or a non-volatile computer-readable storage medium carrying computer-readable code. When the computer-readable code is run in an electronic device, a processor in the electronic device performs one or more of the service methods in the first aspect or the plurality of possible implementations of the first aspect, or performs one or more of the service methods in the second aspect or the plurality of possible implementations of the second aspect.

These aspects and other aspects of this application are more concise and more comprehensive in descriptions of the following (a plurality of) embodiments.

BRIEF DESCRIPTION OF DRAWINGS

Accompanying drawings included in this specification and constituting a part of this specification and this specification jointly show example embodiments, features, and aspects of this application, and are intended to explain principles of this application.

FIG. 4A and FIG. 4B are a schematic interaction flowchart of a service access method according to an embodiment of this application;

FIG. 5A and FIG. 5B are a schematic interaction flowchart of a service access method according to an embodiment of this application;

DESCRIPTION OF EMBODIMENTS

Figure 1A:
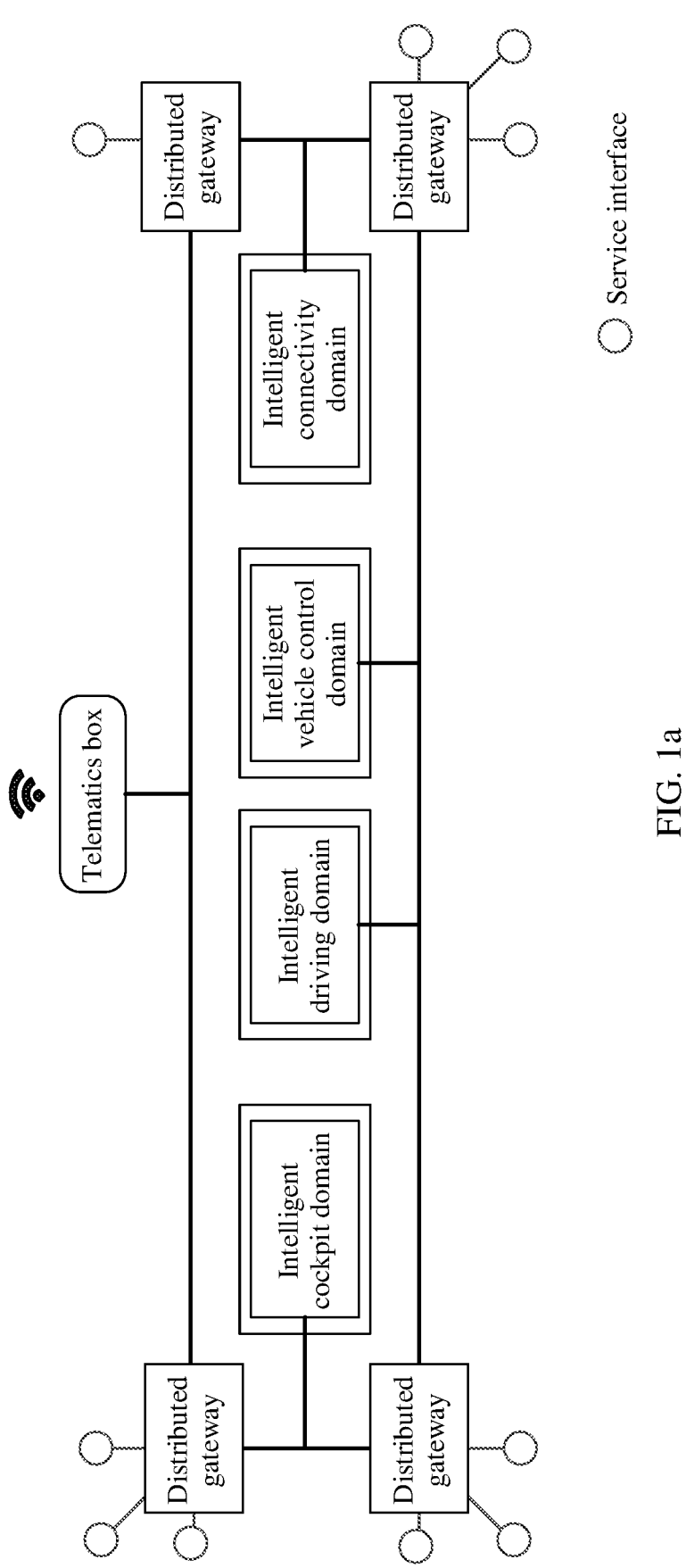
FIG. 1a is a schematic architectural diagram of an in-vehicle ring network according to an embodiment of this application.

The following describes various example embodiments, features, and aspects of this application in detail with reference to accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

It should be noted that ordinal numbers such as "first" and "second" used in embodiments of this application are used to distinguish between a plurality of objects, and are not intended to limit a sequence, a time sequence, priorities, or importance of the plurality of objects. For example, the first identifier, the second identifier, and the like are merely used to distinguish between different identifier types, but do not indicate that the two identifiers have different structures, importance levels, and the like.

A specific term "example" herein means "used as an example, embodiment or illustration". Any embodiment described as "example" is not necessarily explained as being superior or better than other embodiments.

In addition, to better describe this application, numerous exemplary details are given in the following exemplary implementations. A person skilled in the art should understand that this application can also be implemented without some specific details. In some embodiments, methods, means, elements, and circuits that are well-known to a person skilled in the art are not described in detail, so that a subject matter of this application is highlighted.

FIG. 1a is a schematic architectural diagram of an in-vehicle ring network according to an embodiment of this application. As shown in FIG. 1a, an in-vehicle ring network includes an in-vehicle Ethernet and in-vehicle distributed gateways to form a basic architecture. Software platforms such as an intelligent cockpit domain, an intelligent driving domain, and an intelligent vehicle control domain are connected through the in-vehicle ring network to implement communication between the software platforms. Each software platform is connected with a service interface in a vehicle through the in-vehicle ring network, and then the software platform can access a service in the vehicle. Each software platform is also connected to a telematics box (T-Box) in the vehicle through the in-vehicle ring network, so as to implement communication between the software platform and a device outside the vehicle (for example, a roadside device, user equipment, a software platform in other vehicles, or a cloud server). Service interfaces may also be connected by using the in-vehicle ring network, so as to implement communication between the service interfaces.

In this embodiment of this application, the service interfaces include software interfaces used to access software services, and input/output (IO) abstraction interface used to access hardware resources.

In implementation, the software services may represent a function module used to implement data fusion or logical control, or an algorithm module having a common service attribute. In an example, the software services may include vehicle control functional domain services such as a power domain service, a chassis domain service, a thermal management service, and a body domain service. The power domain service may be a torque management service, a charging control service, or the like. The chassis domain service may be a suspension service, or the like. The thermal management service may be an assembly thermal management service, a cabin thermal management service, or the like. The body domain service may be a seat service, a window service, a light service, or the like. The foregoing is merely an example for description of the software services. The software services in this embodiment of this application may alternatively be other software services. Application programming interfaces (API) of the software services are the software interfaces used to access the software services. Correspondingly, in an example, the software interfaces may include vehicle control functional domain service interfaces such as a power domain service interface, a chassis domain service interface, a thermal management service interface, and a body domain service interface.

In implementation, the hardware resources may include a sensor, an actuator, an electronic control unit (Legacy ECU), or the like. The APIs that are obtained after abstraction and encapsulation are performed on the hardware resources and that can provide a single function are the IO abstraction interfaces used to access the hardware resources. In an example, sensors and actuators in a service-oriented architecture (SOA) may be nearby connected to the in-vehicle distributed gateways and encapsulated into the IO abstraction interfaces. In still another example, inherited (Legacy) ECUs in another architecture may be depacketized and encapsulated into IO abstraction interfaces based on bus information. The inherited ECUs in the another architecture may include an electric power steering (EPS) system, a micro controller unit (MCU), an electronic stability control (ESC) system, an on board charger (OBC), and the like.

Figure 1B:
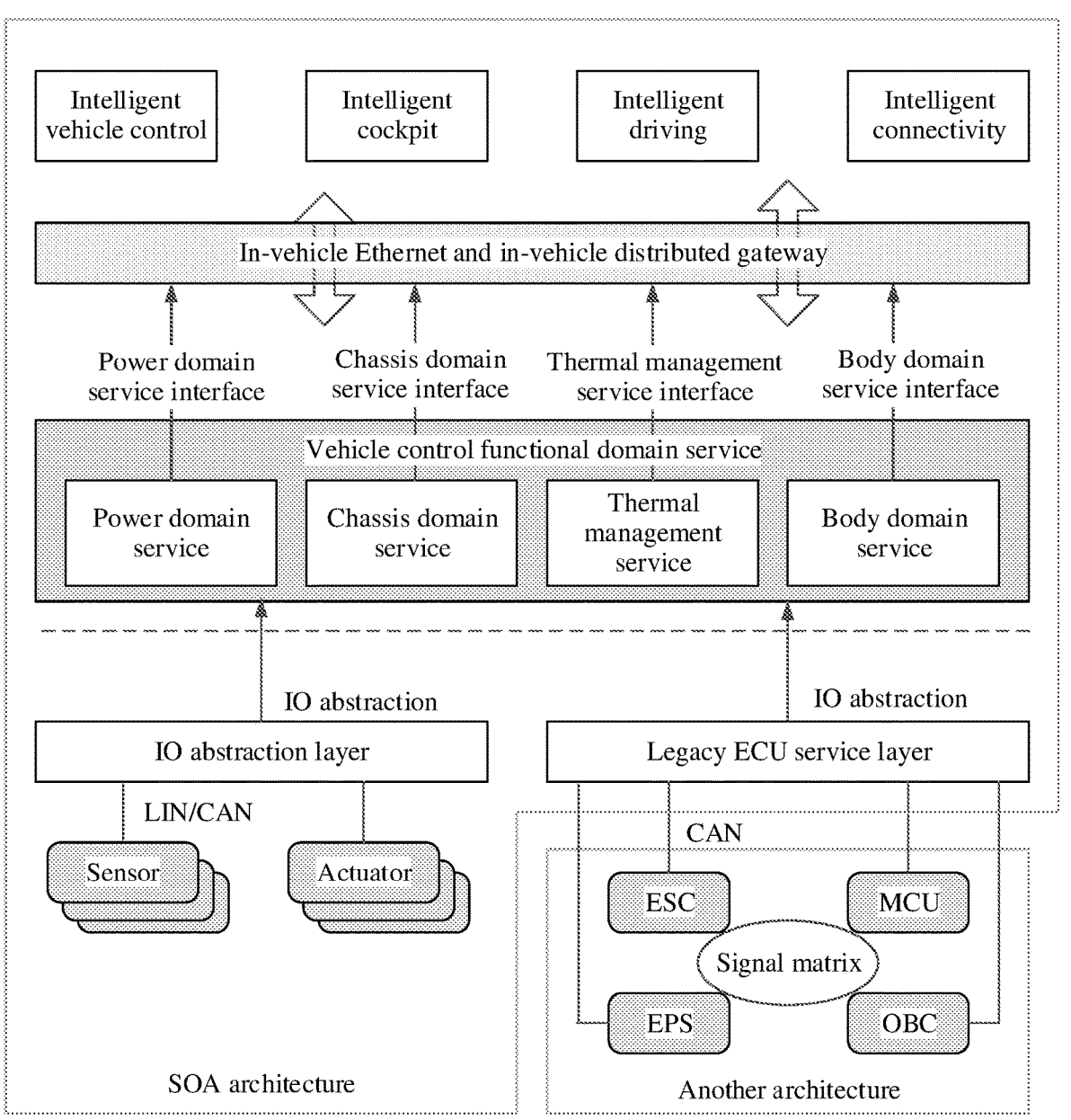
FIG. 1b is an example schematic diagram of service interfaces according to an embodiment of this application.

FIG. 1b is an example schematic diagram of service interfaces according to an embodiment of this application. As shown in FIG. 1b, hardware resources such as sensors and actuators may be encapsulated into an IO abstraction layer through an internal interconnect network (Local Interconnect Network, LIN) or a controller area network (CAN), and the IO abstraction layer provides IO abstraction interfaces for the outside. Hardware resources such as an ESC, an MCU, an EPS, and an inherited OBC in another architecture are encapsulated into a legacy ECU service layer through a CAN, and the legacy ECU service layer provides IO abstraction interfaces for the outside. The IO abstraction layer lies between a hardware layer (for example, the hardware resources) and a software service layer.

As shown in FIG. 1b, vehicle control functional domain services such as a power domain service, a chassis domain service, a thermal management service, and a body domain service at the software service layer are respectively provided with vehicle control functional domain service interfaces, such as a power domain service interface, a chassis domain service interface, a thermal management service interface, and a body domain service interface. These vehicle control functional domain service interfaces are located between the software service layer and an application layer.

As shown in FIG. 1b, the application layer includes applications on platforms such as intelligent vehicle control, intelligent cockpit, intelligent driving, and intelligent connectivity. An intelligent battery life application, a driving mode control application, and the like may be deployed on the intelligent vehicle control platform. An automatic parking application or the like can be deployed on the intelligent driving platform. A game application and an off-car application can be deployed on the intelligent cockpit platform. A remote query application and a one-click vehicle preparation application can be deployed on the intelligent connectivity platform.

In this embodiment of this application, a service requesting unit, a communication unit, and a service providing unit are distributed in different apparatuses or in a same apparatus. The apparatus may be a vehicle or a cloud. In an example, the service requesting unit, the communication unit, and the service providing unit may be distributed in a vehicle. In still another example, the service requesting unit may be distributed on a cloud, and the communication unit and the service providing unit may be distributed in the vehicle. Correspondingly, in this embodiment of this application, the applications at the application layer may further include cloud-end applications (such as applications on a cloud server or applications on a third-party server, which are not shown in FIG. 1b), such as a rescue application and a navigation application. The applications on the cloud server may also access software services in the vehicle by using software interfaces shown in FIG. 1b, and access hardware resources in the vehicle by using IO abstraction interfaces shown in FIG. 1b.

It should be noted that the foregoing is merely an example of the service interfaces. The service interfaces shown in FIG. 1a may further include another software interface and IO abstraction interface. The service interfaces are not limited in this embodiment of this application.

Figure 1C:
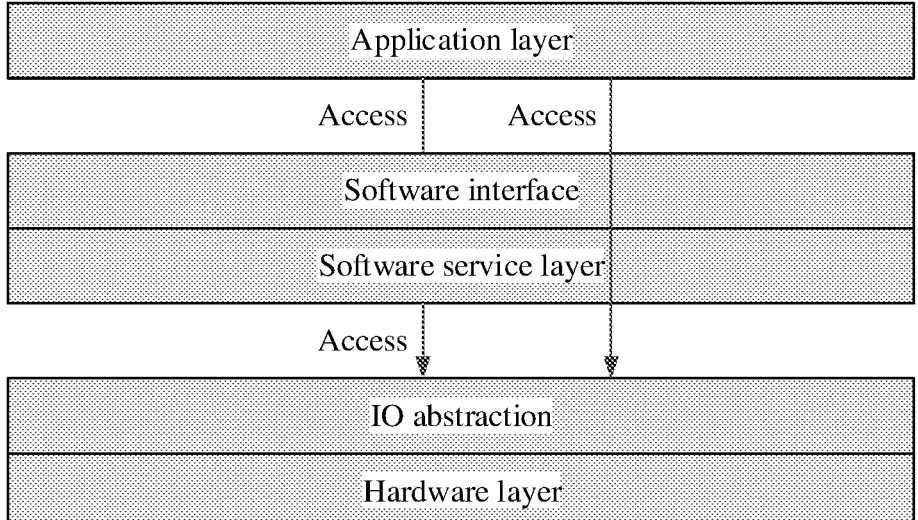
FIG. 1c is a schematic diagram of an access relationship according to an embodiment of this application.

In this embodiment of this application, execution of the applications needs to invoke the software services and/or the hardware resources, and execution of the software services may also need to invoke the hardware resources. FIG. 1c is a schematic diagram of an access relationship according to an embodiment of this application. As shown in FIG. 1c, applications at an application layer may access software services at a software service layer by using software interfaces, and access hardware resources at a hardware layer by using IO abstraction interfaces. The software services at the software service layer may access the hardware resources at the hardware layer by using the IO abstraction interface. The applications at the application layer may be vehicle-end applications, or may be cloud-end applications. In this embodiment of this application, security control of access permission relates to security control of access permission of the applications for the software services, security control of access permission of the applications for the hardware resources, and security control of access permission of the software services for the hardware resources.

In this embodiment of this application, the applications may be deployed on vehicle platforms such as intelligent vehicle control, intelligent cockpit, intelligent driving, and intelligent connectivity shown in FIG. 1b, or may be deployed on a cloud. In other words, there is cross-platform service access for the applications in this embodiment of this application. The software services may be software services deployed on devices such as a power domain, a chassis domain, a thermal management domain, and a body domain. In other words, there is cross-device service access for the software services. The hardware resources may be sensors and actuators in an SOA architecture, or may be integrated ECUs in another architecture. In other words, there is cross-architecture and cross-vehicle model service access for the IO abstraction interfaces. Based on the cross-platform, cross-device, cross-vehicle model, and cross-architecture service access, there are also cross-system and cross-communication protocol service access.

An embodiment of this application provides a service access method, to implement cross-platform, cross-device, cross-architecture, cross-protocol, and cross-system service access permission control, and improve access security of a vehicle-end service. For example, according to the service access method provided in this embodiment of this application, applications on different software platforms (including intelligent vehicle control, intelligent cockpit, intelligent driving, and intelligent connectivity) can control access permission of software services on different devices (including devices in a power domain, a chassis domain, a thermal management service and a body domain). The applications on the different software platforms can control access permission of IO abstraction interfaces on different architectures (including an SOA architecture and other architectures). The software services on the different devices can control access permission of the IO abstraction interfaces on the different architectures.

Figure 2:
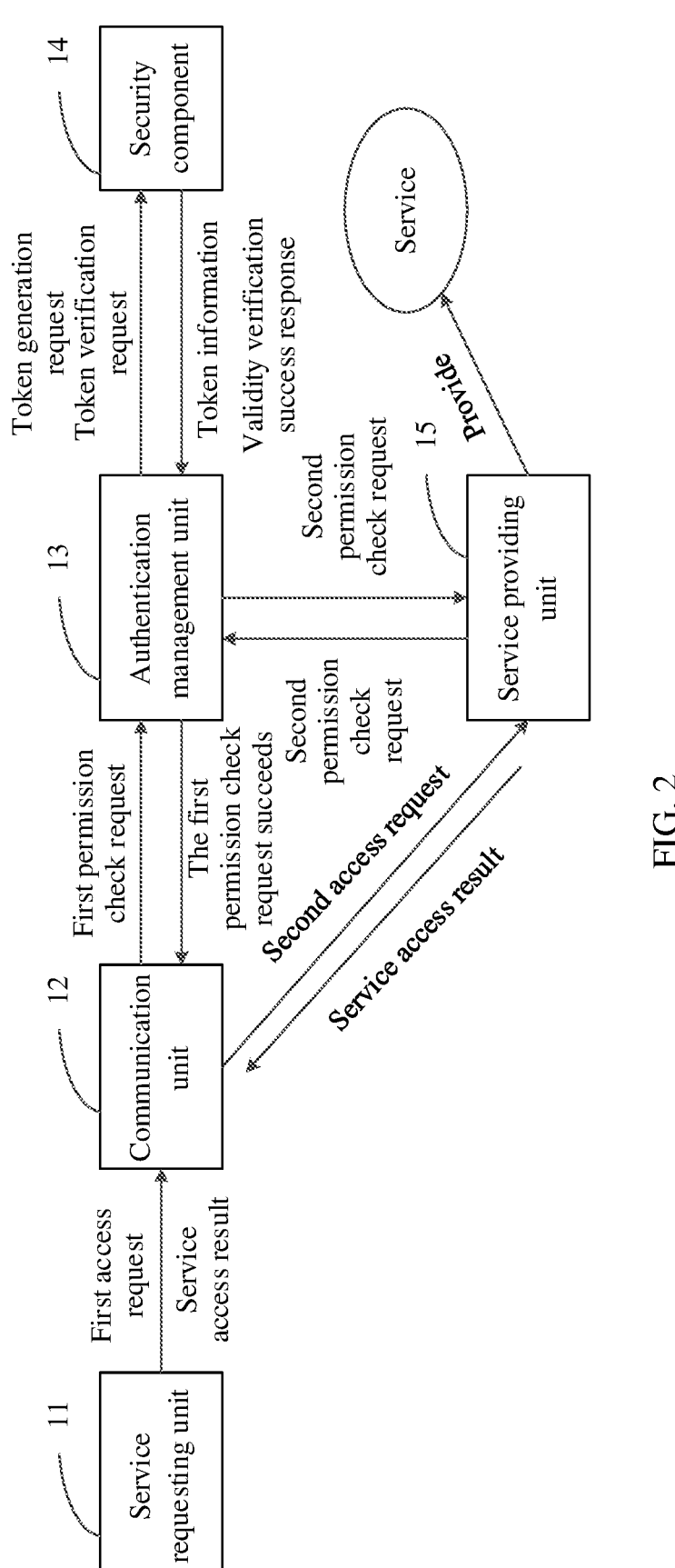
FIG. 2 is a schematic diagram of a structure of a service access system according to an embodiment of this application.

FIG. 2 is a schematic diagram of a structure of a service access system according to an embodiment of this application. As shown in FIG. 2, the service access system includes: a service requesting unit 11, a communication unit 12, an authentication management unit 13, a security component 14, and a service providing unit 15. In the service access system, a quantity of service requesting units 11 and service providing units 15 may be one or more. The communication unit 12, the authentication management unit 13, and the security component 14 may be deployed in a centralized manner or in a distributed manner. This is not limited in this embodiment of this application.

Refer to FIG. 2. The service requesting unit 11 may represent a unit requesting a service. The service requesting unit 11 may include applications (including vehicle-end applications and cloud-end applications, where the vehicle-end applications may be applications on software platforms, such as intelligent vehicle control, intelligent cockpit, intelligent driving, and intelligent connectivity shown in FIG. 1*b*) and/or software services (such as vehicle control functional domain services like a power domain service, a chassis domain service, a thermal management service, and a body domain service shown in FIG. 1*b*). It may be understood that the foregoing is merely an example of description of the service requesting unit 11, and the service requesting unit 11 may alternatively be another application or software service.

Refer to FIG. 2. The service providing unit 15 may represent a unit providing a service. The service providing unit 15 may include software interfaces (such as vehicle control functional domain service interfaces like a power domain service interface, a chassis domain service interface, a thermal management service interface, and a body domain service interface shown in FIG. 1*b*) and/or IO abstraction interfaces (for example, IO abstraction interfaces obtained after sensors and the actuators shown in FIG. 1*b* are abstracted and encapsulated, or IO abstraction interfaces obtained after inherited ECUs in another architecture shown in FIG. 1*b* are encapsulated). The software interfaces can provide the software services, and the IO abstraction interfaces can provide the hardware resources. It may be understood that the foregoing is merely an example description of the service providing unit 15, and the service providing unit 15 may alternatively be another software service or IO abstraction interface.

Refer to FIG. 2. The communication unit 12 may represent a unit connecting the service requesting unit 11 and the service providing unit 15. In an example, the communication unit 12 may be a proxy or a client. The cloud-end applications and the vehicle-end applications may communicate with the service providing unit 15 deployed in a vehicle by using the communication unit 12 deployed in the vehicle. When invoking a service, the service requesting unit 11 sends an access request. In this embodiment of this application, the service requesting unit 11 first sends a service request to the communication unit 12 for permission control. When the communication unit 12 determines that the service requesting unit 11 has the permission to access the corresponding service, the communication unit 12 sends an access request to the service providing unit 15. In this way, validity of access requests can be improved, a quantity of invalid access requests arriving at the service providing unit 15 can be reduced, communication resources can be saved, a workload of the service providing unit 15 can be reduced, and service providing efficiency can be improved.

In the process, the access request sent by the service requesting unit 11 to the communication unit 12 is referred to as a first access request. The access request sent by the communication unit 12 to the service providing unit 15 is referred to as a second access request. "First" and "Second" are used to distinguish different access requests, but are not used to describe a specific order. Both the first access request and the second access request are access requests, and are used to request a service from the service providing unit 15.

Refer to FIG. 2. The authentication management unit 13 may be configured to determine whether the service requesting unit 11 has permission to access the service. In this embodiment of this application, both the communication unit 12 and the service providing unit 15 may perform permission control. The communication unit 12 may send a permission check request to the authentication management unit 13, to determine whether the service requesting unit 11 has permission to access the requested service, and further determine whether the access request is valid. The service providing unit 15 may also send a permission check request to the authentication management unit 13, to determine whether the service requesting unit 11 has permission to access the requested service, and further determine whether to provide the service or refuse to provide the service. It may be understood that the authentication management unit 13 connected to the communication unit 12 and the authentication management unit connected to the service providing unit 15 may be the same or different. This is not limited in this application.

In the process, the permission check request sent by the communication unit 12 to the authentication management unit 13 is referred to as a first permission check request. The permission check request sent by the service providing unit to the authentication management unit 13 is referred to as a second permission check request. "First" and "Second" are used to distinguish different check requests, but are not used to describe a specific order. Both the first permission check request and the second permission check request are permission check requests, and are used to determine whether the service requesting unit 11 has permission to access the requested service.

Refer to FIG. 2. The security component 14 is connected to the authentication management unit 13. The security component can be used to generate and verify a token. After receiving the first permission check request sent by the communication unit 12, the authentication management unit 13 may send a token generation request to the security component 14 when the permission check succeeds. The security component 14 generates and returns token information to the authentication management unit 13 in response to the token generation request. After receiving the second permission check request sent by the service providing unit 15, the authentication management unit 13 may send a token verification request to the security component 14. In response to the token verification request, the security component 14 verifies validity of the token, and returns a validity verification success response to the authentication management unit 13 when validity verification succeeds. After receiving the validity verification success response, the authentication management unit 13 may determine that the service requesting unit 11 has the permission to access the requested service.

In the process, a process in which the security component 14 generates the token corresponds to a process in which the security component 14 verifies the token. If the process of generating the token is an encryption process, the process of verifying the token is a decryption process. If the process of generating the token is an information excerpt process, the process of verifying the token is a process of verifying an excerpt. In this embodiment of this application, the security component 14 may generate and verify the token by using a symmetric encryption/decryption algorithm or an asymmetric encryption/decryption algorithm. This is not limited in this application. A length of the token generated by the security component 14 may be 256 bits, 511 bits, or the like. This is not limited in this application.

The service access system shown in FIG. 2 may be obtained based on an architecture of an in-vehicle ring network shown in FIG. 1a. Therefore, the in-vehicle ring network shown in FIG. 1a may include the service requesting unit 11, the communication unit 12, the authentication management unit 13, the security component 14, and the service providing unit 15 shown in FIG. 2.

In the process, a process in which the security component 14 generates the token corresponds to a process in which the security component 14 verifies the token. If the process of generating the token is an encryption process, the process of verifying the token is a decryption process. If the process of generating the token is an information excerpt process, the process of verifying the token is a process of verifying an excerpt. In this embodiment of this application, the security component 14 may generate and verify the token by using a symmetric encryption/decryption algorithm or an asymmetric encryption/decryption algorithm. This is not limited in this application. A length of the token generated by the security component 14 may be 256 bits, 511 bits, or the like. This is not limited in this application.

The service access system shown in FIG. 2 may be obtained based on an architecture of an in-vehicle ring network shown in FIG. 1a. Therefore, the in-vehicle ring network shown in FIG. 1a may include the service requesting unit 11, the communication unit 12, the authentication management unit 13, the security component 14, and the service providing unit 15 shown in FIG. 2.

Figure 3:
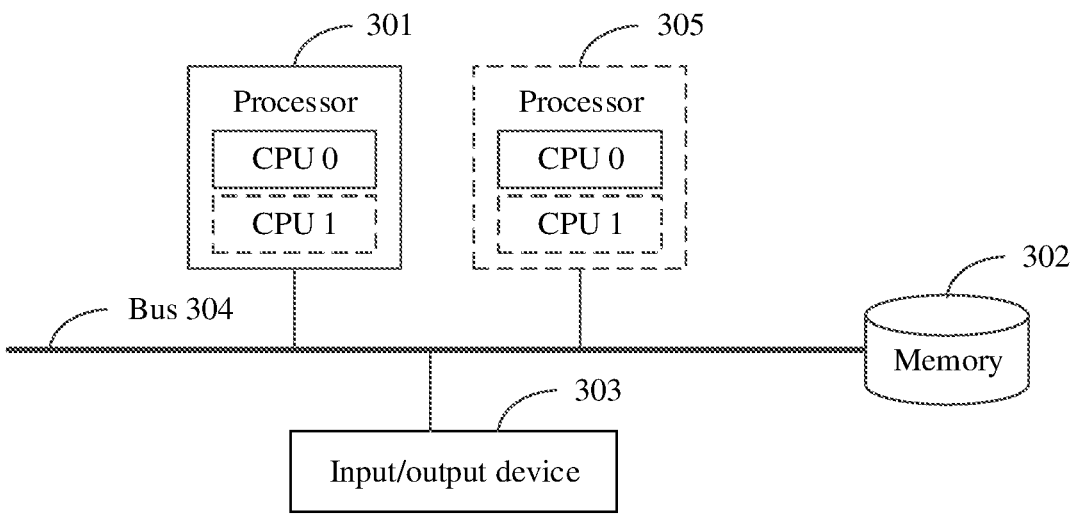
FIG. 3 is a schematic diagram of a structure of an electronic device.

In this embodiment of this application, the service requesting unit 11, the communication unit 12, the authentication management unit 13, the security component 14, and the service providing unit 15 that are shown in FIG. 2 may be deployed on an electronic device having a wireless communication function, or may be deployed in a cluster including a plurality of electronic devices. FIG. 3 is a schematic diagram of a structure of an electronic device.

As shown in FIG. 3, the electronic device may include at least one processor 301, a memory 302, an input/output device 303, and a bus 304. The following describes each component of the electronic device in detail with reference to FIG. 3.

The processor 301 is a control center of the electronic device, and may be a processor, or may be a collective term of a plurality of processing elements. For example, the processor 301 is a CPU or may be an application-specific integrated circuit (ASIC), or one or more integrated circuits configured to implement embodiments of this application, such as one or more microprocessors (DSP) or one or more field programmable gate arrays (FPGA).

The processor 301 may perform various functions of the electronic device by running or executing a software program stored in the memory 302 and invoking data stored in the memory 302.

During exemplary implementation, in an embodiment, the processor 301 may include one or more CPUs, for example, a CPU 0 and a CPU 1 shown in the figure.

During exemplary implementation, in an embodiment, the electronic device may include a plurality of processors, for example, the processor 301 and a processor 305 shown in FIG. 3. Each of the processors may be a single-core (single-CPU) processor, or may be a multi-core (multi-CPU) processor. The processor herein may be one or more devices, circuits, and/or processing cores configured to process data (for example, computer program instructions).

The memory 302 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, the memory 302 is not limited thereto. The memory 302 may exist independently, and is connected to the processor 301 through the bus 304. The memory 302 may alternatively be integrated with the processor 301.

The input/output device 303 is configured to communicate with another device or a communication network, for example, configured to communicate with a communication network such as the Ethernet, a radio access network (RAN), or a wireless local area network (WLAN). The input/output device 303 may include all or a part of a baseband processor, and may selectively include a radio frequency (RF) processor. The RF processor is configured to send or receive an RF signal. The baseband processor is configured to process a baseband signal converted from an RF signal, or a baseband signal to be converted into an RF signal.

During exemplary implementation, in an embodiment, the input/output device 303 may include a transmitter and a receiver. The transmitter is configured to send a signal to another device or a communication network, and the receiver is configured to receive a signal sent by the another device or the communication network. The transmitter and the receiver may exist independently or may be integrated together.

The bus 304 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 3, but this does not indicate that there is only one bus or only one type of bus.

A device structure shown in FIG. 3 does not constitute a limitation on the electronic device. The electronic device may include components more or fewer than those shown in the figure, or some components may be combined, or different component arrangements may be used.

The service access method provided in this embodiment of this application may be applied to the service access system shown in FIG. 2. The service access method provided in this embodiment of this application includes: A service requesting unit sends a first access request to a communication unit. The communication unit obtains, from system data, a first identifier corresponding to the service requesting unit, and obtains, from the first access request, a second identifier corresponding to a service. The communication unit determines an authentication result based on the first identifier and the second identifier. When the authentication result indicates that the service requesting unit has the permission to access the service, the communication unit generates a second access request, and sends the second access request to a service providing unit. The service providing unit determines, based on the first identifier, the second identifier, and token information in the second access request, whether the service providing unit has the permission to access the service. When the service providing unit determines that the service requesting unit has the permission to access the service, the service providing unit provides the service and returns a service access result of "the request succeeds" to the communication unit. When the service providing unit determines that the service requesting unit does not have the permission to access the service, the service providing unit returns a service access result of "the request is rejected" to the communication unit. The communication unit forwards the received service access result to the service requesting unit.

In this embodiment of this application, the first identifier corresponding to the service requesting unit is obtained from the system data, to improve reliability of an identity of the service requesting unit, and further improve reliability of the authentication result. The communication unit performs permission control on the service requesting unit, so that invalid requests can be screened out, and validity of access requests can be improved. The service providing unit performs permission control on the service requesting unit, to reduce invalid authorization and improve service security.

Figure 4A:
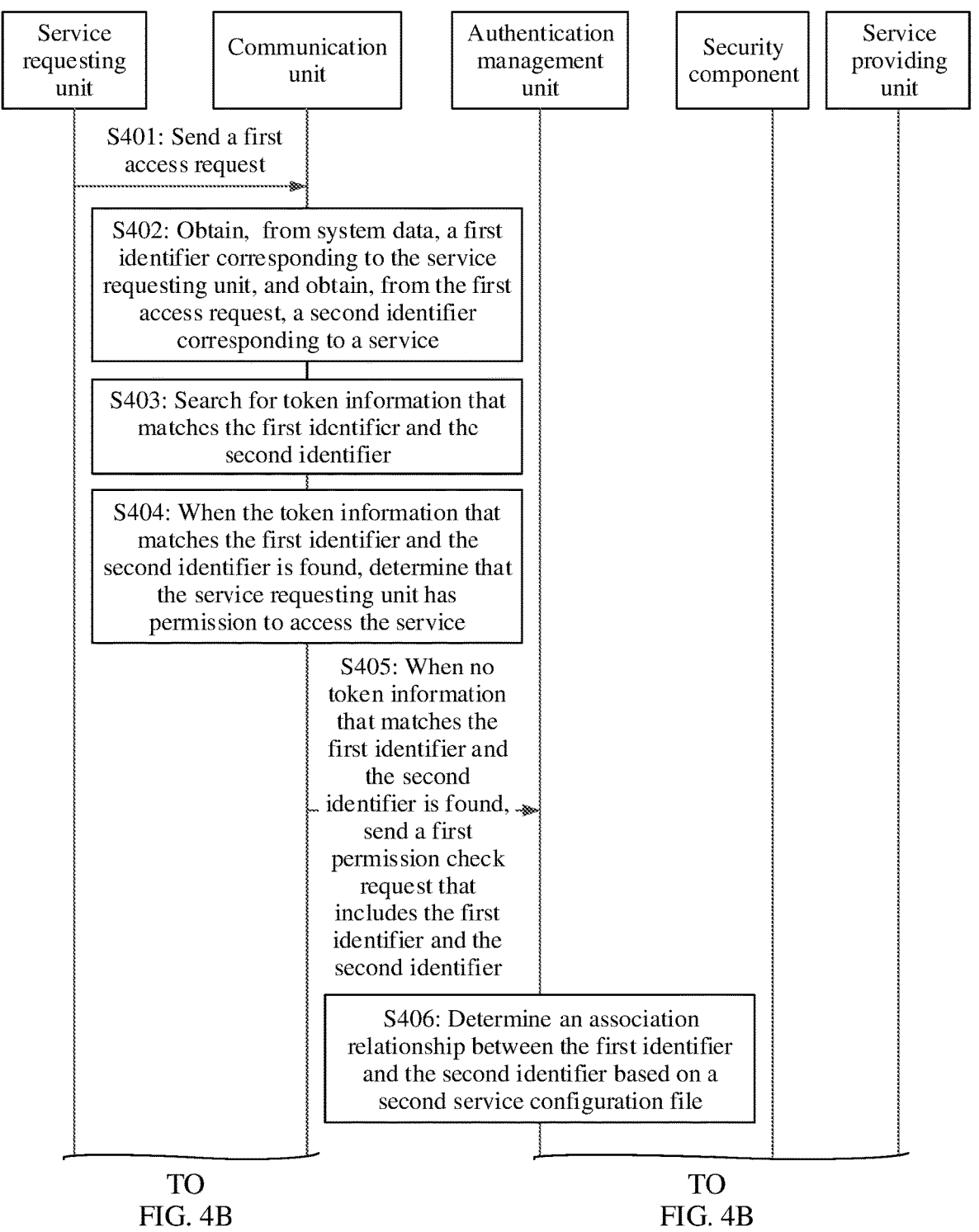
Figure 5A:
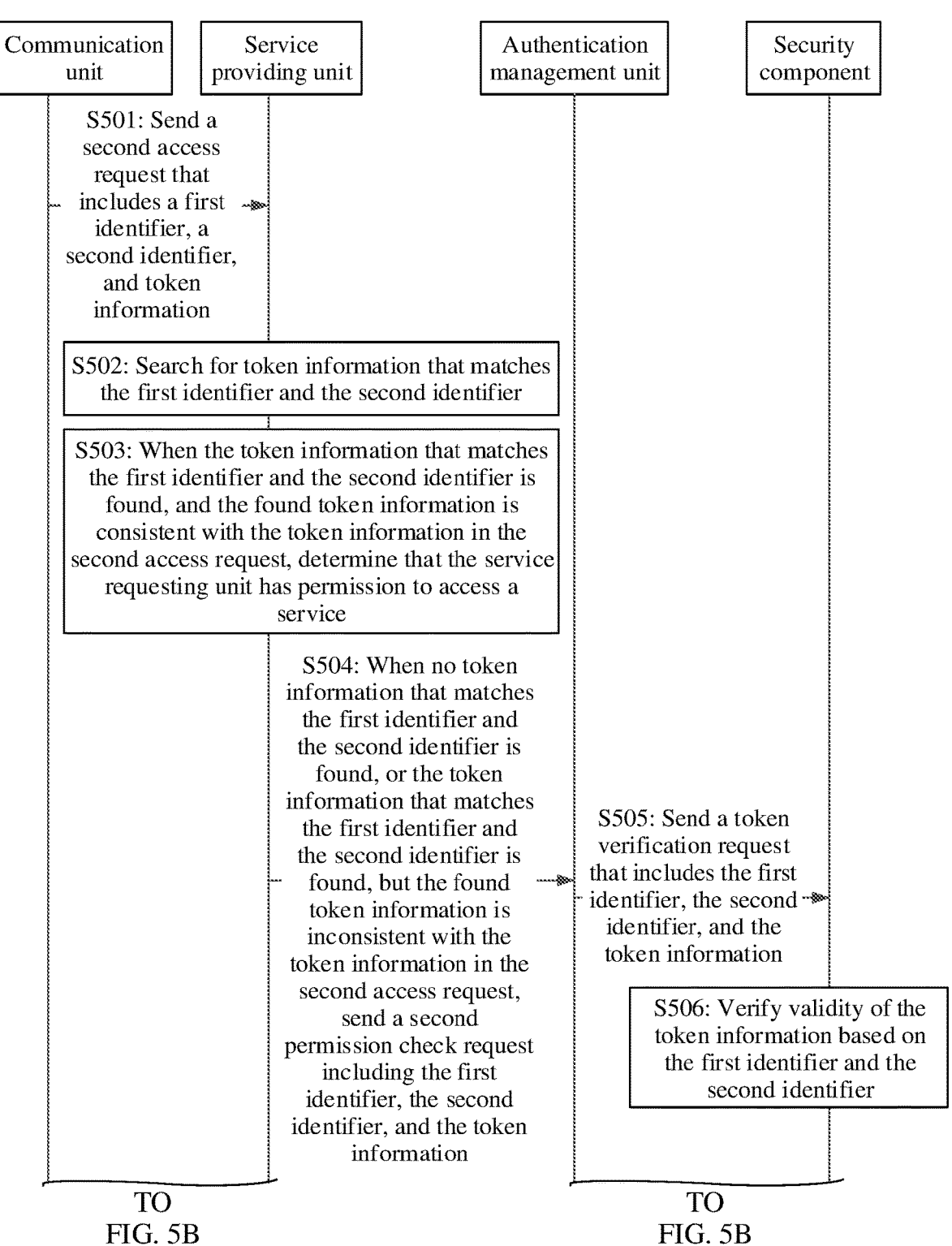

The following describes a process in which the communication unit performs permission control on the service requesting unit with reference to FIG. 4A and FIG. 4B, and describes a process in which the service providing unit performs permission control on the service requesting unit with reference to FIG. 5A and FIG. 5B.

FIG. 4A and FIG. 4B are a schematic interaction flowchart of a service access method according to an embodiment of this application. As shown in FIG. 4A and FIG. 4B, the service access method includes the following steps.

Step S401: A service requesting unit sends a first access request to a communication unit.

Step S402: The communication unit obtains, from system data, a first identifier corresponding to the service requesting unit, and obtains, from the first access request, a second identifier corresponding to a service.

The first access request indicates that the service requesting unit requests a service from the service providing unit. The first identifier indicates an identifier corresponding to the service requesting unit, and the second identifier indicates an identifier corresponding to the service requested by the service requesting unit. In an example, the first identifier may be an application number, an application name, a software service number, a software service name, or the like. The second identifier may be a software service number, a software service name, an IO abstraction interface number, an IO abstraction interface name, or the like. In this embodiment of this application, the first identifier may alternatively be another identifier that can uniquely identify the service requesting unit, and the second identifier may alternatively be another identifier that can uniquely identify the service. The first identifier and the second identifier are not limited in this embodiment of this application.

In implementation, a granularity of permission control may be determined by controlling a range of the service corresponding to the second identifier. A smaller range of the service corresponding to the second identifier indicates a finer granularity of permission control, and a larger range of the service corresponding to the second identifier indicates a coarser granularity of permission control. In this way, flexibility of permission control can be provided.

In this embodiment of this application, when receiving the first access request, the communication unit determines that the service requesting unit needs to request a service from the service providing unit. In this case, the communication unit first confirms an identity of the service requesting unit. To prevent the service requesting unit from tampering with an identity of the service requesting unit or forging an identity of another service requesting unit, the communication unit may obtain the first identifier corresponding to the service requesting unit from the system data. In an example, different processes correspond to different communication pipelines, and the communication unit may determine, based on an identifier of a communication pipeline of a process corresponding to the first access request, the first identifier corresponding to the service requesting unit. In still another example, an execution management module (EM) in an SOA architecture generates the first identifier corresponding to the service requesting unit, and the communication unit may obtain the first identifier based on system data in the SOA architecture. It may be understood that the communication unit may further obtain the first identifier corresponding to the service requesting unit by using other system data. The service to be invoked by the service requesting unit is specified by the service requesting unit. Therefore, the communication unit may obtain the second identifier corresponding to the service from the first access request.

Then, the communication unit may determine an authentication result based on the first identifier and the second identifier. Herein, the authentication result may indicate whether the service requesting unit has permission to access the service. When the authentication result indicates that the service requesting unit has the permission to access the request, it indicates that the first access request is a valid access request, and the communication unit may send the second access request to the service providing unit, so that the service providing unit provides the service based on the second access request. When the authentication result indicates that the service requesting unit does not have the permission to access the request, it indicates that the first access request is an invalid access request, and the communication unit does not send the second access request to the service providing unit. In this way, the communication unit filters out an invalid access request. This can improve security, save communication resources between the communication unit and the service providing unit, and reduce a workload of the service providing unit.

In a possible implementation, the communication unit may determine a state of a service authentication switch corresponding to the first identifier in a first service configuration file. When the state of the service authentication switch corresponding to the first identifier is a third state, the authentication result is determined based on the first identifier and the second identifier. When the state of the service authentication switch corresponding to the first identifier is a fourth state, the communication unit may not perform the step of determining the authentication result based on the first identifier and the second identifier, but directly generate a third access request based on the first identifier and the second identifier, and send the third access request to the service providing unit. Herein, the third access request is sent by the communication unit to the service providing unit, like the second access request. A difference between the third access request and the second access request is that the third access request does not have token information, but the second access request includes token information.

The first service configuration file may indicate a correspondence between the first identifier corresponding to the service requesting unit and the state of the service authentication switch corresponding to the service requesting unit. The state of the service authentication switch is the third state or the fourth state. In an example, the third state may be enabled, and the fourth state may be disabled. In still another example, the third state may be on, and the fourth state may be off.

When the state of the service authentication switch corresponding to the first identifier is the third state, it indicates that permission control needs to be performed on the service requesting unit corresponding to the first identifier. When the state of the service authentication switch corresponding to the first identifier is the fourth state, it indicates that permission control does not need to be performed on the service requesting unit corresponding to the first identifier.

During implementation, a developer can configure a service invoking policy through a configuration management interface. In a possible implementation, the service invoking policy may include the first service configuration file. In the first service configuration file, for each service requesting unit, a developer may determine whether permission control needs to be performed on the service requesting unit, and set the state of the service authentication switch corresponding to the identifier of the service requesting unit to the third state or the fourth state. After being powered on, the communication unit may load the first service configuration file. In this way, after receiving the first access request, the communication unit may determine the state of the service authentication switch corresponding to the first identifier in the first service configuration file, and further determine whether to perform permission control on the service requesting unit.

As described above, when the service authentication switch corresponding to the first identifier is in the third state, the communication unit may determine the authentication result based on the first identifier and the second identifier. In implementation, the communication unit may implement the process of determining the authentication result based on the first identifier and the second identifier by using step S403 to step S410.

Step S403: The communication unit searches for token information that matches the first identifier and the second identifier.

In a possible implementation, when one service unit has permission to access one service, the communication unit may establish an association relationship between the first identifier corresponding to the service requesting unit and the second identifier corresponding to the service and token information generated based on the first identifier and the second service identifier.

The communication unit may first search for token information that matches the first identifier and the second identifier. The token information that has established the association relationship with the first identifier and the second identifier is the token information that matches the first identifier and the second identifier. If the token information that matches the first identifier and the second identifier is found, the communication unit may determine that the service requesting unit corresponding to the first identifier has the permission to access the service corresponding to the second identifier (corresponding to step S404). If no token information that matches the first identifier and the second identifier is found, the communication unit may further determine, by using the authentication management unit, whether the service requesting unit corresponding to the first identifier has the permission to access the service corresponding to the second identifier (corresponding to step S405 to step S410).

Step S404: When the token information that matches the first identifier and the second identifier is found, the communication unit determines that the service requesting unit has the permission to access the service.

Step S405: When no token information that matches the first identifier and the second identifier is found, the communication unit sends, to the authentication management unit, a first permission check request that includes the first identifier and the second identifier.

The first permission check request requests the authentication management unit to check whether the service requesting unit has the permission to access the service.

Step S406: The authentication management unit determines an association relationship between the first identifier and the second identifier based on a second service configuration file.

The second service configuration file indicates the association relationship between the first identifier and the second identifier corresponding to the service to which the service requesting unit has the access permission.

In implementation, the service invoking policy configured by the developer on the configuration management interface may include the second service configuration file. In the second service configuration file, for each service requesting unit, the developer may establish a correspondence between a first identifier corresponding to the service requesting unit and a second identifier corresponding to a service to which the service requesting unit has access permission. After being powered on, the authentication management unit may load the second service configuration file. In this way, after receiving the first permission check request, the authentication management unit may determine, based on the first identifier, the second identifier, and the second service configuration file, whether the service requesting unit has the permission to access the service.

If there is the association relationship between the first identifier and the second identifier, it indicates that the service requesting unit has the permission to access the service. In this case, the authentication management unit may perform step S407 to obtain the token information. If there is no association relationship between the first identifier and the second identifier, it indicates that the service requesting unit does not have the permission to access the service. In this case, the authentication management unit may return, to the communication unit, a response indicating that the first permission check request fails. Correspondingly, after receiving the response indicating that the first permission check request fails, the communication unit does not generate and send the second access request. In a possible implementation, after receiving the response indicating that the first permission check request fails, the communication unit may send, to the service requesting unit, the response indicating that the first access request fails, so that the service requesting unit learns a result of the access request.

Figure 6:
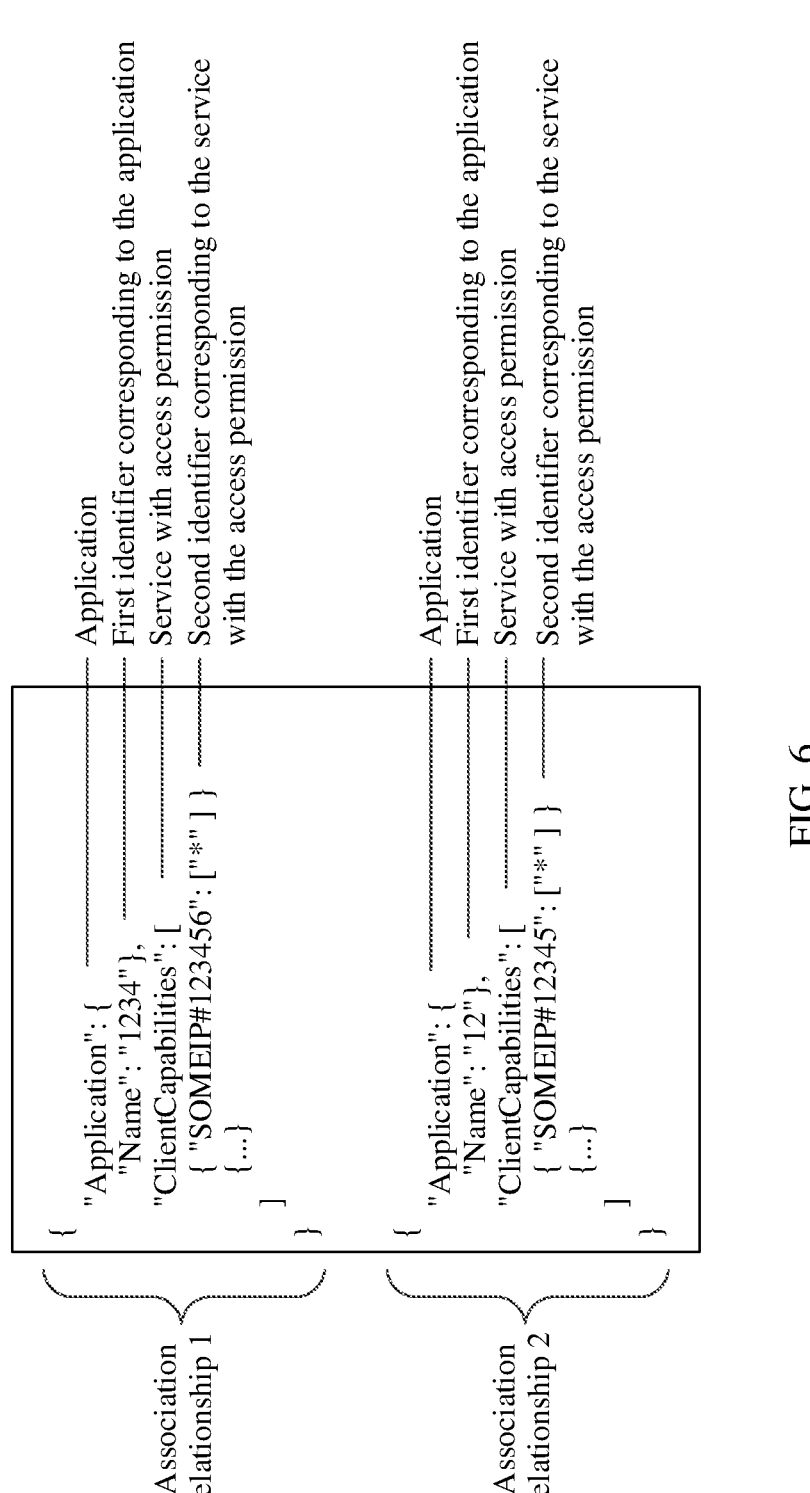
FIG. 6 is an example schematic diagram of a second configuration file according to an embodiment of this application.

FIG. 6 is an example schematic diagram of a second configuration file according to an embodiment of this application. As shown in FIG. 6, first identifiers corresponding to two service requesting units and second identifiers corresponding to two services are configured in a second configuration file, to indicate that there is an association relationship between the two first identifiers and the two second identifiers. As shown in 6, an association relationship 1 in the second configuration file indicates that an application (that is, a service requesting unit) whose first identifier is "1234" has permission to access a service whose second identifier is "123456". An association relationship 2 in the second configuration file indicates that an application whose first identifier is "12" has permission to access a service whose second identifier is "12345".

Step S407: When there is the association relationship between the first identifier and the second identifier, the authentication management unit sends, to the security component, a token generation request that includes the first identifier and the second identifier.

Step S408: The security component generates the token information based on the first identifier and the second identifier, and returns the token information to the authentication management unit.

In a possible implementation, the token information may be a token (that is, an encryption result obtained by encrypting the first identifier and the second identifier). In a possible implementation, the token information may be a token and a random number. In this case, the token in the token information is an encryption result obtained by performing an encryption operation on the first identifier, the second identifier, and the random number. Herein, the random number is used during the encryption operation, so that reliability of the token can be further improved, and security of permission control can be further improved.

Step S409: The authentication management unit returns a first response to the communication unit, where the first response indicates that the first permission check request succeeds, and the first response includes the token information returned by the security component.

Step S410: When the first permission check request succeeds, the communication unit determines that the service requesting unit has the permission to access the service.

In step S404 and step S410, the communication unit may determine that the service requesting unit has the permission to access the service. In this case, the communication unit may generate the second access request by performing step S411.

Step S411: When the service requesting unit has the permission to access the service, the communication unit generates the second access request based on the first identifier, the second identifier, and the token information.

In a possible implementation, the step S411 may include: when the token information that matches the first identifier and the second identifier is found, generating the second access request based on the first identifier, the second identifier, and the token information that matches the first identifier and the second identifier.

In a possible implementation, the step S411 may include: generating the second access request based on the first identifier, the second identifier, and token information returned by the authentication management unit.

Step S412: The communication unit sends the second access request to the service providing unit.

In this embodiment of this application, the communication unit performs permission control on the service requesting unit, so that invalid invoking can be reduced, and validity of access requests can be improved.

In a possible implementation, when receiving the first response, the communication unit may establish the association relationship between the token information in the first response and both the first identifier and the second identifier.

Herein, the association relationship between the token information and both the first identifier and the second identifier is generated when the authentication management unit confirms that the first permission check request succeeds (that is, the service requesting unit has the permission to access the service). Therefore, when the communication unit subsequently finds, based on the association relationship, token information that matches a first identifier corresponding to one service requesting unit and a second identifier corresponding to one service, it indicates that the service requesting unit has the permission to access the service. In this case, the process of obtaining the token information in the step S405 to the step S410 is not repeated. Therefore, resources can be saved, efficiency can be improved, and permission does not need to be repeatedly confirmed. This is better applicable to a secure and low-latency scenario.

In a possible implementation, the communication unit may further subscribe to status information of the service requesting unit, to determine a status of the service requesting unit. When the service requesting unit is in the first state, the token information associated with the first identifier corresponding to the service requesting unit is in an unavailable state; and when the service requesting unit is in the second state, the token information associated with the first identifier corresponding to the service requesting unit is in an available state. Herein, the first state may be an offline state or a powered-off state, and the second state may be an online state or an activated state. It may be understood that when the token information is in the unavailable state, the communication unit cannot generate the second access request by using the token information. In this way, a new access request can be prevented from using old token information to pass authentication. This improves security, saves resources, and reduces repeated calculation.

In a possible implementation, the communication unit may further set a validity period for the token information. When a retention period of the token information exceeds the validity period, the communication unit may delete the token information. This avoids a problem of security degradation caused by aging of the token information.

In implementation, in addition to obtaining the token information by using the authentication management unit after receiving the first access request, and establishing the association relationship between the token information and both the first identifier and the second identifier, the communication unit may further obtain the token information by using the authentication management unit on another occasion.

In an example, after the service providing unit broadcasts the service, the communication unit may confirm, by using the authentication management unit, access permission of an online service requesting unit for the broadcast service. When the online service requesting unit has the access permission for the broadcast service, the communication unit may obtain, from the authentication management unit, token information corresponding to the online service requesting unit and the broadcast service. In this case, the communication unit may establish an association relationship between the obtained token information, and the first identifier corresponding to the online service requesting unit and the second identifier corresponding to the broadcast service. Then, when receiving the first access request for the broadcast service that is performed by the online service requesting unit, the communication unit may find the associated token information, and further generate the second access request based on the found token information. In this way, after receiving the first access request, the communication unit may quickly generate and send the second access request. This saves a time period for calculating the token information, and improves efficiency.

In a possible implementation, after the service providing unit broadcasts that a service is stopped, the communication unit may set token information associated with a second identifier corresponding to the stopped service to an unavailable state. In this way, invalid access requests can be reduced.

In a possible implementation, when the service requesting unit is in the second state, or after the service providing unit broadcasts that the service is stopped, the communication unit may further delete the associated token information. This saves storage space.

In still another example, it is considered that the service requesting unit in the vehicle or on the cloud and the service that can be provided by the service providing unit in the vehicle are clear, and therefore, the token information stored in the communication unit may be fixed in a development phase. The security component can calculate all the token information that may be used in the development phase. After being powered on, the communication unit may load all association relationships between first identifiers corresponding to service requesting units and second identifiers corresponding to services, and token information. In this way, efficiency can be further improved, and computing resources during vehicle running can be saved.

FIG. 5A and FIG. 5B are a schematic interaction flowchart of a service access method according to an embodiment of this application. As shown in FIG. 5A and FIG. 5B, the service access method includes the following steps.

Step S501: A communication unit sends, to a service providing unit, a second access request that includes a first identifier, a second identifier, and token information.

For the second access request in step S501, refer to step S411. Details are not described herein again.

The communication unit may determine an authentication result based on the first identifier, the second identifier, and the token information. Herein, the authentication result may indicate whether the service requesting unit has permission to access the service. When the authentication result indicates that the service requesting unit has the permission to access the request, the service providing unit may provide a service to the service requesting unit, and the service requesting unit may return a service access result of "the request successes" to the communication unit. When the authentication result indicates that the service requesting unit does not have the permission to access the request, the service providing unit does not provide the service to the service requesting unit, and the service providing unit may return a service access result of "the request is rejected" to the communication unit. In this way, security control on service access is implemented, and security of service access is improved.

In a possible implementation, the service providing unit may determine a state of a service authentication switch corresponding to the second identifier in a third configuration file. When the state of the service authentication switch corresponding to the second identifier is a third state, the service providing unit may determine an authentication result based on the first identifier, the second identifier, and the token information. When the state of the service authentication switch corresponding to the second identifier is a fourth state, the service providing unit directly provides the service to the service requesting unit The third service configuration file indicates a correspondence between the second identifier corresponding to the service and the state of the service authentication switch corresponding to the service. The state of the service authentication switch is the third state or the fourth state. In an example, the third state may be enabled, and the fourth state may be disabled. In still another example, the third state may be on, and the fourth state may be off.

When the state of the service authentication switch corresponding to the second identifier is the third state, it indicates that permission control needs to be performed before the service is provided. When the state of the service authentication switch corresponding to the second identifier is the fourth state, it indicates that permission control does not need to be performed before the service is provided.

In implementation, the service invoking policy configured by the developer may include the third configuration file. In the third service configuration file, for each service provided by each service providing unit, the developer may determine whether permission control needs to be performed for service invoking, and set the state of the service authentication switch corresponding to the second identifier of the service to the third state or the fourth state. After being powered on, the service providing unit may load the third service configuration file. In this way, after receiving the second access request, the service providing unit may obtain the second identifier from the second access request, determine the state of the service authentication switch corresponding to the second identifier in the third service configuration file, and further determine whether to perform permission control on service invoking.

In this embodiment of this application, a first service configuration file, a second service configuration file, and the third service configuration file form a service invoking policy. The first service configuration file, the second service configuration file, and the third service configuration file may be three independent service configuration files, or may be three parts in one service configuration file. This is not limited in this embodiment of this application. The service configuration files corresponding to the service invoking policy may be binary files, JSON files, or the like. This is not limited in this application. The service configuration files (including the first service configuration file, the second service configuration file, and the third service configuration file) may be built in an installation package of an application or a component (for example, an ECU). Because the installation package is already signed, no additional integrity protection is required for the service configuration file. The service configuration files can also be packaged into an image of an operating system. The first service configuration file, the second service configuration file, and the third service configuration file may be built in a same installation package or different installation packages. When being used, the first service configuration file, the second service configuration file, and the third service configuration file may simultaneously exist, or may be independently loaded. This is not limited in this embodiment of this application.

As described above, when the service authentication switch corresponding to the second identifier is in the third state, the service providing unit may determine an authentication result based on the first identifier, the second identifier, and the token information. In implementation, the service providing unit may implement, by using step S502 to step S510, a process of determining the authentication result based on the first identifier, the second identifier, and the token information.

Step S502: The service providing unit searches for token information that matches the first identifier and the second identifier.

The service providing unit may first search for the token information that matches the first identifier and the second identifier. The token information that has established an association relationship with the first identifier and the second identifier is the token information that matches the first identifier and the second identifier. If the token information that matches the first identifier and the second identifier is found, and the found token information is consistent with the token information in the second access request, the communication unit may determine that the service requesting unit corresponding to the first identifier has the permission to access the service corresponding to the second identifier (corresponding to the step S503). If no token information that matches the first identifier and the second identifier is found, or the token information that matches the first identifier and the second identifier is found, but the found token information is inconsistent with the token information in the second access request, the service providing unit may further determine, by using the authentication management unit, whether the service requesting unit corresponding to the first identifier has the permission to access the service corresponding to the second identifier (corresponding to the step S504 to the step S510).

Step S503: When the token information that matches the first identifier and the second identifier is found, and the found token information is consistent with the token information in the second access request, the service providing unit determines that the service requesting unit has the permission to access the service.

When the token information that matches the first identifier and the second identifier is found, and the found token information is consistent with the token information in the second access request, it indicates that the service requesting unit corresponding to the first identifier has the permission to access the service corresponding to the second identifier. In this case, the service providing unit may provide the corresponding service.

Step S504: If no token information that matches the first identifier and the second identifier is found, or if the token information that matches the first identifier and the second identifier is found but the found token information is inconsistent with the token information in the second access request, the service providing unit sends a second permission check request including the first identifier, the second identifier, and the token information to the authentication management unit.

When no token information that matches the first identifier and the second identifier is found, it indicates that the service requesting unit corresponding to the first identifier requests the service corresponding to the second identifier for the first time after going online (including going offline and then going online again). The service providing unit does not determine whether the service requesting unit corresponding to the first identifier has the permission to access the service corresponding to the second identifier. Therefore, the service providing unit may further determine, by using the authentication management unit, whether the service requesting unit corresponding to the first identifier has the permission to access the service corresponding to the second identifier.

When the token information that matches the first identifier and the second identifier is found, but the found token information is inconsistent with the token information in the second access request, it indicates that the information in the second access request is tampered with, or after the service requesting unit corresponding to the first identifier goes offline, the service providing unit does not delete the corresponding token information in time. In this case, the service providing unit cannot determine whether the service requesting unit corresponding to the first identifier has the permission to access the service corresponding to the second identifier. Therefore, the service providing unit may further determine, by using the authentication management unit, whether the service requesting unit corresponding to the first identifier has the permission to access the service corresponding to the second identifier.

Step S505: The authentication management unit sends, to the security component, a token verification request that includes the first identifier, the second identifier, and the token information.

Before determining whether the service requesting unit has the permission to access the service, the authentication management unit first needs to perform validity verification on the token information. Therefore, the authentication management unit may send the token verification request to the security component.

Step S506: The security component verifies validity of the token information based on the first identifier and the second identifier.

When the token information is a token, the security component decrypts the token based on a key, and if the first identifier and the second identifier that are obtained through decryption are consistent with the first identifier and the second identifier in the token verification request, it is determined that validity verification of the token information succeeds.

When the token information is a token and a random code, the security component decrypts the token based on a key, and if the first identifier, the second identifier, and the random code that are obtained through decryption are consistent with the first identifier, the second identifier, and the random code in the token verification request, it is determined that validity verification of the token information succeeds. Here, the random code is added to further improve security.

It should be noted that the token information is generated in the step S408 and the validity verification of the token information in step S506 correspond to each other. In this embodiment of this application, generation and verification of the token information may be implemented by using a symmetric encryption and decryption method, or by using an asymmetric encryption and decryption method. The key used in encryption and decryption may be obtained based on the identifier of the service providing unit, or may be configured in the security component in a unified manner. A length of the token obtained through encryption may be 256 bits, 511 bits, or the like. This is not limited in this embodiment of this application. In an example, the security component may generate a token and perform validity verification on the token by using an HMAC-SHA256 algorithm. In this case, a length of the token is 256 bits.

Step S507: When the validity verification of the token information succeeds, the security component sends, to the authentication management unit, a response indicating that the token verification request succeeds.

Step S508: When the token verification request succeeds, the authentication management unit determines an association relationship between the first identifier and the second identifier based on a second configuration file.

For the step S508, refer to step S406. Details are not described herein again.

Step S509: When there is the association relationship between the first identifier and the second identifier, the authentication management unit sends a second response to the service providing unit, where the second response indicates that the second permission check request succeeds.

In a possible implementation, if there is no association relationship between the first identifier and the second identifier, it indicates that the service requesting unit does not have the permission to access the service. In this case, the authentication management unit may return, to the service providing unit, a response indicating that the second permission request fails. Correspondingly, the service providing unit does not provide the service to the service requesting unit.

Step S510: When the second response is received, the service providing unit determines that the service requesting unit has the permission to access the service.

Step S511: When the service requesting unit has the permission to access the service, the service providing unit provides the service for the service requesting unit.

In this embodiment of this application, the service providing unit performs permission control on the service requesting unit, to reduce invalid authorization and improve validity of service authorization.

In a possible implementation, when receiving the second response, the service providing unit may establish an association relationship between the token information verified by the authentication management unit and both the first identifier and the second identifier.

Herein, the correspondence between the first identifier and the second identifier and the token information is generated when the token validity verification of the security component succeeds and the authentication management unit confirms that the service requesting unit has the permission to access the service. Therefore, when the service providing unit subsequently finds, based on the association relationship, token information that matches a first identifier corresponding to one service requesting unit and a second identifier corresponding to one service, and the token information is consistent with the token information in the second access request, it indicates that the service requesting unit has the permission to access the service. In this case, the service can be provided without repeating the permission check process in step S504 to step S510. Therefore, resources can be saved, efficiency can be improved, and permission does not need to be repeatedly confirmed. This is better applicable to a secure and low-latency scenario.

In a possible implementation, the service providing unit may further subscribe to status information of the service requesting unit, to determine a status of the service requesting unit. When the service requesting unit is in the first state, the token information associated with the first identifier corresponding to the service requesting unit is in an unavailable state; and when the service requesting unit is in the second state, the token information associated with the first identifier corresponding to the service requesting unit is in an available state. Herein, the first state may be an offline state or a powered-off state, and the second state may be an online state or an activated state. It may be understood that, when the token information is in the unavailable state, the service providing unit cannot check the second permission request by using the token information. In this way, a new access request can be prevented from using old token information to pass authentication. This improves security, saves resources, and reduces repeated calculation.

In a possible implementation, the service providing unit may further set a validity period for the token information.

When a retention period of the token information exceeds the validity period, the service providing unit may delete the token information. This avoids a problem of security degradation caused by aging of the token information.

In a possible implementation, when the service providing unit determines to provide the service corresponding to the second identifier for the service requesting unit corresponding to the first identifier (the step S503 and the step S510 are included), the service providing unit may further return a service access result of "the request successes" to the communication unit.

In a possible implementation, when receiving a response indicating that the second permission check fails, the service providing unit returns a service access result of "the request is rejected" to the communication unit.

Thereafter, the communication unit forwards the received service access result ("the request successes" or "the request is rejected") to the service requesting unit.

According to the service access method provided in this embodiment of this application, cross-platform, cross-device, cross-architecture, cross-protocol, and cross-system service access permission control is implemented, and security of an in-vehicle ring network is improved.

The following uses an AP architecture and a CP architecture as an example for description.

In the AP architecture, APIAuth client functions as the communication unit and the service providing unit, APIAuthMgr functions as the authentication management unit, and SecUnit functions as the security component. In the AP architecture, the application invokes APIAuth client, and then APIAuth client invokes APIAuthMgr to check the permission. This process is equivalent to the process in which the communication unit performs permission control on the service requesting unit shown in FIG. 4A and FIG. 4B, and this process can reduce invalid invocation. A service process invokes APIAuth client, and then APIAuth client invokes APIAuthMgr to check the permission. This process is equivalent to the process in which the service providing unit performs permission control on the service requesting unit shown in FIG. 5A and FIG. 5B, and this process can reduce invalid authorization.

In the CP architecture, AuthXF functions as the communication unit and the service providing unit, TrustFunction functions as the authentication management unit, and SecUnit functions as the security component. In the CP architecture, an application invokes a function interface AuthXF of an RTE. AuthXF invokes a permission check interface and a token generation verification interface through TrustFunction. This process is equivalent to the process in which the communication unit performs permission control on the service requesting unit shown in FIG. 4A and FIG. 4B, and this process can reduce invalid invocation. The service process invokes the function interface AuthXF of the RTE. AuthXF invokes the permission check interface and the token generation verification interface through TrustFunction. This process is equivalent to the process in which the service providing unit performs permission control on the service requesting unit shown in FIG. 5A and FIG. 5B, and this process can reduce invalid authorization.

Figure 7:
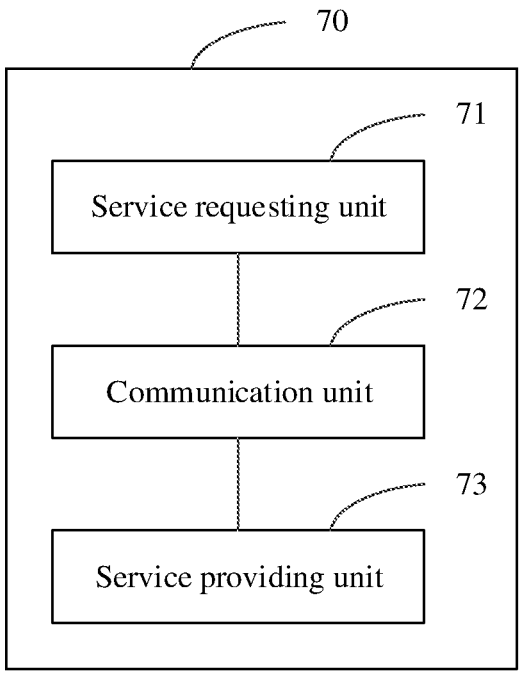
FIG. 7 is a schematic architectural diagram of a service access system according to an embodiment of this application.

FIG. 7 is a schematic architectural diagram of a service access system according to an embodiment of this application. The service access system may be configured to implement the service access methods shown in FIG. 4A and FIG. 4B and FIG. 5A and FIG. 5B. As shown in FIG. 7, the service access system 70 includes a service requesting unit 71, a communication unit 72, and a service providing unit 73.

The service requesting unit 71 is configured to send a first access request, where the first access request requests a service from a service providing unit.

The communication unit 72 is configured to: obtain, from system data, a first identifier corresponding to the service requesting unit; obtain, from the first access request, a second identifier corresponding to the service; determine an authentication result based on the first identifier and the second identifier, where the authentication result indicates whether the service requesting unit has permission to access the service; and when the authentication result indicates that the service requesting unit has the permission to access the service, generate a second access request, and send the second access request to the service providing unit.

The service providing unit 73 is configured to provide the service to the service providing unit based on the received second access request.

In a possible implementation, the service requesting unit, the communication unit, and the service providing unit are distributed in different apparatuses or in a same apparatus.

The apparatus may be a vehicle or a cloud server. In an example, the service requesting unit, the communication unit, and the service providing unit may be distributed in a vehicle. In still another example, the service requesting unit may be distributed on a cloud, and the communication unit and the service providing unit may be distributed in the vehicle.

Figure 8:
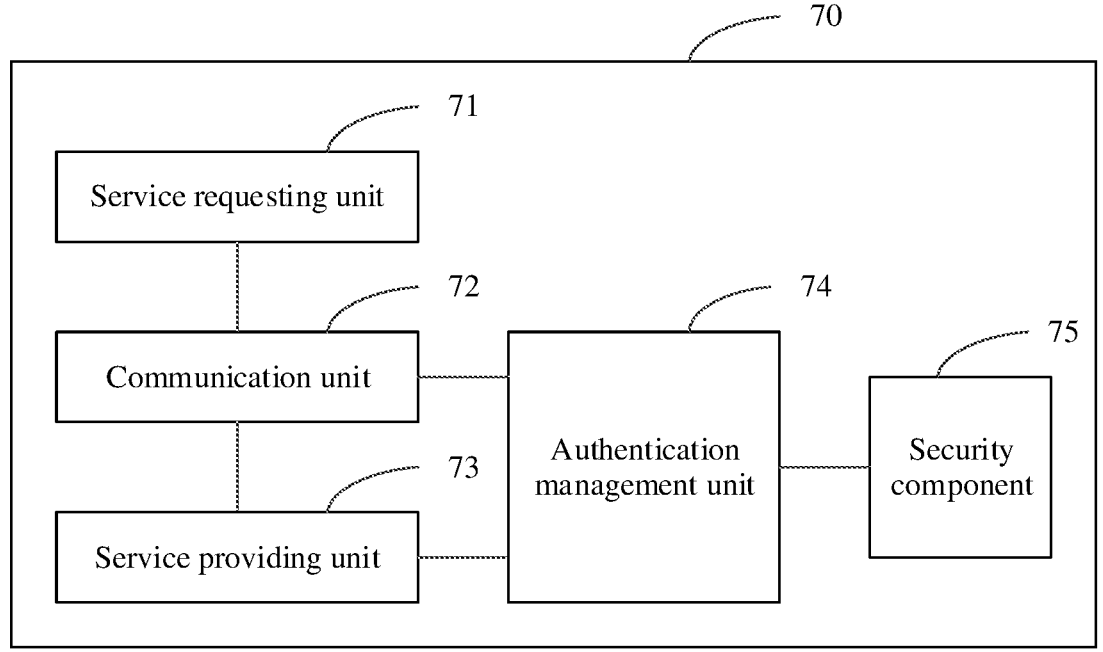
FIG. 8 is a schematic architectural diagram of a service access system according to an embodiment of this application.

FIG. 8 is a schematic architectural diagram of a service access system according to an embodiment of this application. As shown in FIG. 8, based on FIG. 7, the service access system 70 may further include an authentication management unit 74.

The communication unit is further configured to: when no token information that matches the first identifier and the second identifier is found, send a first permission check request to the authentication management unit, where the first permission check request requests the authentication management unit to check whether the service requesting unit has the permission to access the service, and the first permission check request includes the first identifier and the second identifier; and when the first permission check request succeeds, determine that the service requesting unit has the permission to access the service.

The authentication management unit is configured to: receive the first permission check request from the communication unit; determine an association relationship between the first identifier and the second identifier based on a second service configuration file, where the second service configuration file indicates the association relationship between the first identifier and the second identifier corresponding to the service to which the service requesting unit has the access permission; when there is the association relationship between the first identifier and the second identifier, obtain the token information based on the first identifier and the second identifier; and return a first response to the communication unit, where the first response indicates that the first permission check request succeeds, and the first response includes the token information.

As shown in FIG. 8, in a possible implementation, the service access system 70 further includes a security component 75.

The authentication management unit is further configured to send a token generation request to the security component, where the token generation request includes the first identifier and the second identifier.

The security component is configured to: perform encryption processing on the first identifier and the second identifier to obtain the token information; and return the token information to the authentication management unit.

In a possible implementation, the authentication management unit is further configured to: receive a second permission check request from the service providing unit, where the second permission check request requests to check whether the service requesting unit has the permission to access the service, and the second permission check request includes the first identifier, the second identifier, and the token information; verify validity of the token information based on the first identifier and the second identifier; when validity verification of the token information succeeds, determine the association relationship between the first identifier and the second identifier based on the second service configuration file; and when there is the association relationship between the first identifier and the second identifier, return a second response to the service providing unit, where the second response indicates that the second permission check request succeeds.

In a possible implementation, the authentication management unit is further configured to send a token verification request to the security component, where the token verification request includes the first identifier, the second identifier, and the token information. The security component is further configured to verify the validity of the token information based on the first identifier, the second identifier, and the decrypted token information.

An embodiment of this application provides a service access apparatus. The apparatus includes a processor, and a memory configured to store instructions executable by the processor. When the processor is configured to execute the instructions, the method is implemented.

An embodiment of this application provides a non-volatile computer-readable storage medium, where the non-volatile computer-readable storage medium stores computer program instructions. When the computer program instructions are executed by a processor, the foregoing methods are implemented.

This application further provides a service access apparatus, including a service requesting unit, a communication unit, and a service providing unit. The apparatus is configured to implement the method described in embodiments of this application, such as FIG. 4A and FIG. 4B or FIG. 5A and FIG. 5B.

Optionally, the apparatus further includes an authentication management unit.

According to a sixth aspect, this application provides a chip system. The chip system includes at least one processor, configured to support implementation of functions related to the service access method, for example, receiving or processing data and/or information in the method.

In a possible design, the chip system further includes a memory, the memory is configured to store program instructions and data, and the memory is located inside or outside the processor. The chip system may include a chip, or may include a chip and another discrete component.

According to a seventh aspect, this application further provides a service access apparatus, where the service access apparatus includes at least one processor and a communication interface, the communication interface is configured to send and/or receive data, and the at least one processor is configured to invoke a computer program stored in at least one memory, so that the service access apparatus implements the method described in embodiments of this application such as FIG. 4A and FIG. 4B or FIG. 5A and FIG. 5B.

According to an eighth aspect, this application further provides a computer-readable storage medium, where the computer-readable storage medium stores a computer program, and when the computer program runs on one or more processors, the method described in embodiments of this application such as FIG. 4A and FIG. 4B or FIG. 5A and FIG. 5B is implemented.

An embodiment of this application provides a computer program product, including computer-readable code or a non-volatile computer-readable storage medium carrying computer-readable code. When the computer-readable code is run in a processor of an electronic device, the processor in the electronic device performs the foregoing method.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More exemplary examples (a non-exhaustive list) of the computer-readable storage medium include: a portable computer disk, a hard disk, a random access memory (RAM), a read-only memory (ROM), an erasable programmable read-only memory (Electrically Programmable Read-Only-Memory, EPROM, or flash memory), a static random-access memory (SRAM), a portable compact disc read-only memory (CD-ROM), a digital versatile disc (Digital Video Disc, DVD), a memory stick, a floppy disk, a mechanical coding device, for example, a punching card or a groove protrusion structure that stores instructions, and any suitable combination thereof.

The computer-readable program instructions or code described herein may be downloaded from a computer-readable storage medium to each computing/processing device, or downloaded to an external computer or an external storage device over a network, such as the internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this application may be assembly instructions, instruction set architecture (ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (LAN) or a wide area network (WAN), or may be connected to an external computer (for example, connected by using an internet service provider over the internet). In some embodiments, an electronic circuit, for example, a programmable logic circuit, a field programmable gate array (FPGA), or a programmable logic array (PLA), is customized by using status information of computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the accompanying drawings illustrate system architectures, functions, and operations of possible implementations of apparatuses, systems, methods, and computer program products according to a plurality of embodiments of this application. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC) that performs a corresponding function or action, or may be implemented by a combination of hardware and software, for example, firmware.

Although the present disclosure is described with reference to embodiments, in a process of implementing the present disclosure that claims protection, a person skilled in the art may understand and implement another variation of the disclosed embodiments by viewing the accompanying drawings, the disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Embodiments of this application are described above. The foregoing descriptions are examples, are not exhaustive, and are not limited to the disclosed embodiments. A person of ordinary skill in the art would make modifications and changes without departing from the scope and spirit of the described embodiments. The selection of terms used in this specification is intended to best explain the principles of embodiments, practical application, or improvements to technologies in the market, or to enable another person of ordinary skill in the art to understand embodiments disclosed in this specification.

The foregoing descriptions are merely exemplary implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service access method, applied to a service access apparatus that comprises at least one processor, wherein the method comprises:

obtaining, by the at least one processor from system data, a first identifier corresponding to a service requester;

obtaining, by the at least one processor from a first access request, a second identifier corresponding to a service, wherein the first access request indicates that the service requester requests the service from a service provider;

determining, by the at least one processor, an authentication result based on the first identifier and the second identifier, including:

searching for token information that matches the first identifier and the second identifier;

based on the token information that matches the first identifier and the second identifier is found, determining that the service requester has a permission to access the service;

wherein the authentication result indicates whether the service requester has the permission to access the service;

based on the authentication result indicating that the service requester has the permission to access the service, generating, by the at least one processor, a second access request;

sending, by the at least one processor, the second access request to the service provider; and wherein based on the service requester being in an offline or powered-off state, token information associated with the first identifier corresponding to the service requester is in an unavailable state; and based on the service requester being in an online or active state, the token information associated with the first identifier corresponding to the service requester is in an available state.

2. The method according to claim 1, wherein the determining, by the at least one processor, the authentication result based on the first identifier and the second identifier comprises:

based on no token information that matches the first identifier and the second identifier being found, sending, by the at least one processor, a first permission check request to an authentication manager, wherein the first permission check request requests the authentication manager to check whether the service requester has the permission to access the service, and the first permission check request comprises the first identifier and the second identifier; and based on the first permission check request succeeding, determining, by the at least one processor, that the service requester has the permission to access the service.

3. The method according to claim 2, wherein the generating, by the at least one processor, the second access request comprises:

generating, by the at least one processor, the second access request based on the first identifier, the second identifier, and the token information that matches the first identifier and the second identifier.

4. The method according to claim 3, wherein the method further comprises:

establishing, by the at least one processor, an association relationship between the token information that matches the first identifier and the second identifier and both the first identifier and the second identifier.

5. The method according to claim 2, wherein that the first permission check request succeeds is indicated to a communicator by a reception of a first response from the authentication manager, wherein the first response indicates that the first permission check request succeeds, and the first response comprises the token information that matches the first identifier and the second identifier.

6. The method according to claim 1, wherein the method further comprises:

determining, by the at least one processor, whether permission control is needed for the service requester corresponding to the first identifier.

7. The method according to claim 6, wherein the determining, by the at least one processor, the authentication result based on the first identifier and the second identifier comprises:

based on the permission control being needed for the service requester corresponding to the first identifier, determining, by the at least one processor, the authentication result based on the first identifier and the second identifier.

8. The method according to claim 6, wherein the method further comprises:

based on the permission control not being needed for the service requester corresponding to the first identifier, generating, by the at least one processor, a third access request based on the first identifier and the second identifier; and sending, by the at least one processor, the third access request to the service provider.

9. A service access apparatus, comprising:

at least one processor; and

one or more memories coupled to the at least one processor and storing programming instructions executable by the at least one processor to cause the apparatus to:

obtain, from system data, a first identifier corresponding to a service requester;

obtain, from a first access request, a second identifier corresponding to a service, wherein the first access request indicates that the service requester requests the service from a service provider;

determine an authentication result based on the first identifier and the second identifier, including:

searching for token information that matches the first identifier and the second identifier;

based on the token information that matches the first identifier and the second identifier is found, determining that the service requester has permission to access the service wherein the authentication result indicates whether the service requester has a permission to access the service;

based on the authentication result indicating that the service requester has the permission to access the service, generate a second access request;

send the second access request to the service provider; and wherein based on the service requester being in an offline or powered-off state, token information associated with the first identifier corresponding to the service requester is in an unavailable state; and based on the service requester being in an online or active state, the token information associated with the first identifier corresponding to the service requester is in an available state.

10. The apparatus according to claim 9, wherein the programming instructions, when executed by the at least one processor, cause the apparatus to:

based on no token information that matches the first identifier and the second identifier being found, send a first permission check request to an authentication manager, wherein the first permission check request requests the authentication manager to check whether the service requester has the permission to access the service, and the first permission check request comprises the first identifier and the second identifier; and based on the first permission check request succeeding, determine that the service requester has the permission to access the service.

11. The apparatus according to claim 10, wherein the programming instructions, when executed by the at least one processor, cause the apparatus to:

generate the second access request based on the first identifier, the second identifier, and the token information that matches the first identifier and the second identifier.

12. The apparatus according to claim 11, wherein the programming instructions, when executed by the at least one processor, cause the apparatus to:

establish an association relationship between the token information that matches the first identifier and the second identifier and both the first identifier and the second identifier.

13. The apparatus according to claim 9, wherein the programming instructions, when executed by the at least one processor, cause the apparatus to:

generate the second access request based on the first identifier, the second identifier, and the token information that matches the first identifier and the second identifier.

14. The apparatus according to claim 8, wherein the programming instructions, when executed by the at least one processor, cause the apparatus to:

determine whether permission control is needed for the service requester corresponding to the first identifier.

15. The apparatus according to claim 14, wherein the programming instructions, when executed by the at least one processor, cause the apparatus to:

based on the permission control being needed for the service requester corresponding to the first identifier, determine the authentication result based on the first identifier and the second identifier.

16. The apparatus according to claim 14, wherein the programming instructions, when executed by the at least one processor, cause the apparatus to:

based on the permission control not being needed for the service requester corresponding to the first identifier, generate a third access request based on the first identifier and the second identifier; and send the third access request to the service provider.

17. A service access apparatus, comprising:

at least one processor; and one or more memories coupled to the at least one processor and storing programming instructions executable by the at least one processor to cause the apparatus to:

receive a first permission check request from a communicator, wherein the first permission check request requests to check whether a service requester has a permission to access a service, and the first permission check request comprises a first identifier corresponding to the service requester and a second identifier corresponding to the service;

determine an association relationship between the first identifier and the second identifier based on a second service configuration file, wherein the second service configuration file indicates an association relationship between the first identifier and the second identifier corresponding to the service to which the service requester has the access permission;

based on there being the association relationship between the first identifier and the second identifier, obtain token information based on the first identifier and the second identifier;

return a first response to the communicator, wherein the first response indicates that the first permission check request succeeds, and the first response comprises the token information; and wherein based on the service requester being in an offline or powered-off state, token information associated with the first identifier corresponding to the service requester is in an unavailable state; and based on the service requester being in an online or active state, the token information associated with the first identifier corresponding to the service requester is in an available state.

18. The apparatus according to claim 17, wherein the programming instructions, when executed by the at least one processor, cause the apparatus to:

send a token generation request to a security component, wherein the token generation request comprises the first identifier and the second identifier, so that the security component performs encryption processing on the first identifier and the second identifier to obtain the token information; and receive the token information returned by the security component.

19. The apparatus according to claim 17, wherein the programming instructions, when executed by the at least one processor, cause the apparatus to:

receive a second permission check request from a service provider, wherein the second permission check request requests to check whether the service requester has the permission to access the service, and the second permission check request comprises the first identifier, the second identifier, and the token information;

verify validity of the token information based on the first identifier and the second identifier;

based on validity verification of the token information succeeding, determine the association relationship between the first identifier and the second identifier based on the second service configuration file; and based on there being the association relationship between the first identifier and the second identifier, return a second response to the service provider, wherein the second response indicates that the second permission check request succeeds.

20. The apparatus according to claim 19, wherein the programming instructions, when executed by the at least one processor, cause the apparatus to:

send a token verification request to a security component, wherein the token verification request comprises the first identifier, the second identifier, and the token information, so that the security component verifies the validity of the token information based on the first identifier, the second identifier, and decrypted token information.

\* \* \* \* \*